US012792821B2

(12) United States Patent
Tambi et al.

(10) Patent No.: US 12,792,821 B2
(45) Date of Patent: Nov. 10, 2026

(54) UPSIDE-DOWN REINFORCEMENT LEARNING FOR IMAGE GENERATION MODELS

(71) Applicant: ADOBE INC., San Jose, CA (US)

(72) Inventors: Ritiz Tambi, San Francisco, CA (US); Purvak Lapsiya, Toronto (CA); Ajinkya Gorakhnath Kale, San Jose, CA (US); Pranav Vineet Aggarwal, Santa Clara, CA (US); Nikolaos Vlassis, San Jose, CA (US)

(73) Assignee: ADOBE INC., San Jose, CA (US)

( * ) Notice: Subject to any disclaimer, the term of this patent is extended or adjusted under 35 U.S.C. 154(b) by 175 days.

(21) Appl. No.: 18/443,590

(22) Filed: Feb. 16, 2024

(65) Prior Publication Data

US 2025/0117967 A1 Apr. 10, 2025

Related U.S. Application Data

(60) Provisional application No. 63/588,459, filed on Oct. 6, 2023.

(51) Int. Cl.
*G06F 40/166* (2020.01)
*G06T 11/00* (2026.01)
(Continued)

(52) U.S. Cl.
CPC ............ *G06F 40/166* (2020.01); *G06T 11/00* (2013.01); *G06T 11/60* (2013.01); *G06V 10/764* (2022.01)

(58) Field of Classification Search
CPC ........ G06T 11/00; G06T 11/60; G06F 40/166; G06V 10/764; G06V 10/82
See application file for complete search history.

(56) References Cited

U.S. PATENT DOCUMENTS

| | | | |
|---|---|---|---|
| 11,922,550 | B1 | 3/2024 | Ramesh et al. |
| 12,493,937 | B2 | 12/2025 | Harikumar et al. |

(Continued)

FOREIGN PATENT DOCUMENTS

| | | | |
|---|---|---|---|
| CN | 117768678 | A | 3/2024 |
| WO | WO2024107884 | A1 | 5/2024 |

(Continued)

OTHER PUBLICATIONS

Liu, Vivian, Han Qiao, and Lydia Chilton. "Opal: Multimodal image generation for news illustration." Proceedings of the 35th Annual ACM Symposium on User Interface Software and Technology. 2022. (Year: 2022).*

(Continued)

*Primary Examiner* — Daniel F Hajnik
*Assistant Examiner* — Thomas John Foster
(74) *Attorney, Agent, or Firm* — F. CHAU & ASSOCIATES, LLC

(57) ABSTRACT

A method, apparatus, non-transitory computer readable media, and system for image generation include obtaining an input text prompt and an indication of a level of a target characteristic, where the target characteristic comprises a characteristic used to train an image generation model. Some embodiments generate an augmented text prompt comprising the input text and an objective text corresponding to the level of the target characteristic. Some embodiments generate, using the image generation model, an image based on the augmented text prompt, where the image depicts content of the input text prompt and has the level of the target characteristic.

20 Claims, 22 Drawing Sheets

(51) Int. Cl.
*G06T 11/60* (2026.01)
*G06V 10/764* (2022.01)

(56) References Cited

U.S. PATENT DOCUMENTS

| | | | |
|---|---|---|---|
| 12,499,519 | B1 | 12/2025 | Karpman et al. |
| 12,530,822 | B2 | 1/2026 | Ravi et al. |
| 12,536,722 | B2 | 1/2026 | Aggarwal et al. |
| 12,536,778 | B2 | 1/2026 | Bai et al. |
| 12,579,705 | B2 | 3/2026 | Li et al. |
| 12,602,847 | B2 | 4/2026 | Couleaud et al. |
| 2023/0053317 | A1 | 2/2023 | Luo et al. |
| 2024/0161403 | A1 | 5/2024 | Lin et al. |
| 2024/0185035 | A1 | 6/2024 | Yu et al. |
| 2024/0221242 | A1 | 7/2024 | Greenen et al. |
| 2024/0404144 | A1 | 12/2024 | Aggarwal et al. |
| 2025/0095226 | A1 | 3/2025 | Ungureanu-Contes et al. |
| 2025/0095227 | A1 | 3/2025 | Ungureanu-Contes et al. |
| 2025/0111866 | A1 | 4/2025 | Ceylan Aksit et al. |
| 2025/0278816 | A1 | 9/2025 | Aggarwal et al. |
| 2025/0308091 | A1 | 10/2025 | Zhu et al. |
| 2025/0322561 | A1 | 10/2025 | Ungureanu-Contes et al. |
| 2026/0004193 | A1 | 1/2026 | Lee et al. |
| 2026/0067113 | A1 | 3/2026 | Brenna et al. |

FOREIGN PATENT DOCUMENTS

| | | | |
|---|---|---|---|
| WO | WO2024130137 | A1 | 6/2024 |
| WO | WO2024163083 | A1 | 8/2024 |
| WO | WO2024206995 | A1 | 10/2024 |
| WO | WO2024249060 | A1 | 12/2024 |

OTHER PUBLICATIONS

Junnan Li, Dongxu Li, Caiming Xiong, and Steven Hoi. 2022. BLIP: Bootstrapping Language-Image Pre-training for Unifed Vision-Language Understanding and Generation. arXiv:2201.12086 [cs. CV] (Year: 2022).*

Black, et al., "Training Diffusion Models with Reinforcement Learning", arXiv preprint arXiv:2305.13301v2 [cs.LG] May 23, 2023, 21 pages.

Fan, et al., "DPOK: Reinforcement Learning for Fine-tuning Text-to-Image Diffusion Models", arXiv preprint arXiv:2305.16381v1 [cs.LG] May 25, 2023, 26 pages.

Schmidhuber, "Reinforcement Learning Upside Down: Don't Predict Rewards—Just Map Them to Actions", arXiv preprint arXiv:1912.02875v2 [cs.AI] Jun. 23, 2020, 22 pages, Sep. 30, 2025.

Cao, et al., "Reinforcement Learning for Generative AI: A Survey", arXiv preprint arXiv:2308.14328v2 [cs.LG] Aug. 29, 2023, 35 pages.

Office Action dated Mar. 3, 2026 in related U.S. Appl. No. 18/823,839.

Gao, et al., "Can Pre-Trained Text-to-Image Models Generate Visual Goals for Reinforcement Learning?", 37th Conference o Neural Information Processing Systems, pp. 1-14 (2023).

Office Action dated Mar. 19, 2026 in related U.S. Appl. No. 18/823,834.

Office Action dated Jul. 8, 2026 in corresponding U.S. Appl. No. 18/823,839.

* cited by examiner

UPSIDE-DOWN REINFORCEMENT LEARNING FOR IMAGE GENERATION MODELS

CROSS-REFERENCE TO RELATED APPLICATION

This application claims priority under 35 U.S.C. § 119 to U.S. Provisional Application No. 63/588,459, filed on Oct. 6, 2023, in the United States Patent and Trademark Office, the disclosure of which is incorporated by reference herein in its entirety.

BACKGROUND

The following relates generally to machine learning, and more specifically to image generation using a machine learning model. Machine learning algorithms build a model based on sample data, known as training data, to make a prediction or a decision in response to an input without being explicitly programmed to do so. One area of application for machine learning is image generation.

For example, a machine learning model can be trained to predict information for an image in response to an input prompt, and to then generate the image based on the predicted information. In some cases, the prompt can be a text prompt that describes some aspect of the image, such as an item to be depicted, or a style of the depiction. Text-based image generation allows a user to produce an image without having to use an original image as an input, and therefore makes image generation easier for a layperson and also more readily automated.

SUMMARY

Embodiments of the present disclosure provide an image generation system. According to some aspects, the image generation system uses upside-down reinforcement learning by providing a "reward" (e.g., an objective text) as part of input conditioning for fine-tuning an image generation model. In some cases, the objective text is provided based on an output of a classifier model for a training image. In some cases, the objective text is provided by manually annotating the training image. In some cases, the objective text heavily reduces resource requirements when compared to reinforcement learning. For example, in some cases, using the objective text as input conditioning for the image generation model avoids using resource-expensive and high-latency reinforcement learning algorithms for training the image generation model.

A method, apparatus, non-transitory computer readable medium, and system for image generation using machine learning are described. One or more aspects of the method, apparatus, non-transitory computer readable medium, and system include obtaining an input text prompt and an indication of a level of a target characteristic, wherein the target characteristic comprises a characteristic used to train an image generation model; generating an augmented text prompt comprising the input text prompt and an corresponding to the indication of the level of the target characteristic; and generating, using the image generation model, an image based on the augmented text prompt, wherein the image depicts content of the input text prompt and has the level of the target characteristic.

A method, apparatus, non-transitory computer readable medium, and system for image generation using machine learning are described. One or more aspects of the method, apparatus, non-transitory computer readable medium, and system include obtaining training data including a training image that is labeled based on a target characteristic and a training prompt corresponding to the training image, wherein the training prompt includes objective text indicating a level of the target characteristic, and training an image generation model to generate images having the level of the target characteristic based on the training data.

An apparatus and system for image generation using machine learning are described. One or more aspects of the apparatus and system include one or more processors; one or more memory components coupled with the one or more processors; an augmentation component configured to add an objective text to an input text prompt to obtain an augmented text prompt, wherein the objective text indicates a level of a target characteristic identified from a set of target characteristics; and an image generation model comprising image generation parameters stored in the one or more memory components, the image generation model trained to generate an image based on the augmented text prompt and the set of target characteristics, wherein the image depicts content of the input text prompt and has the level of the target characteristic.

DETAILED DESCRIPTION

Figure 1:
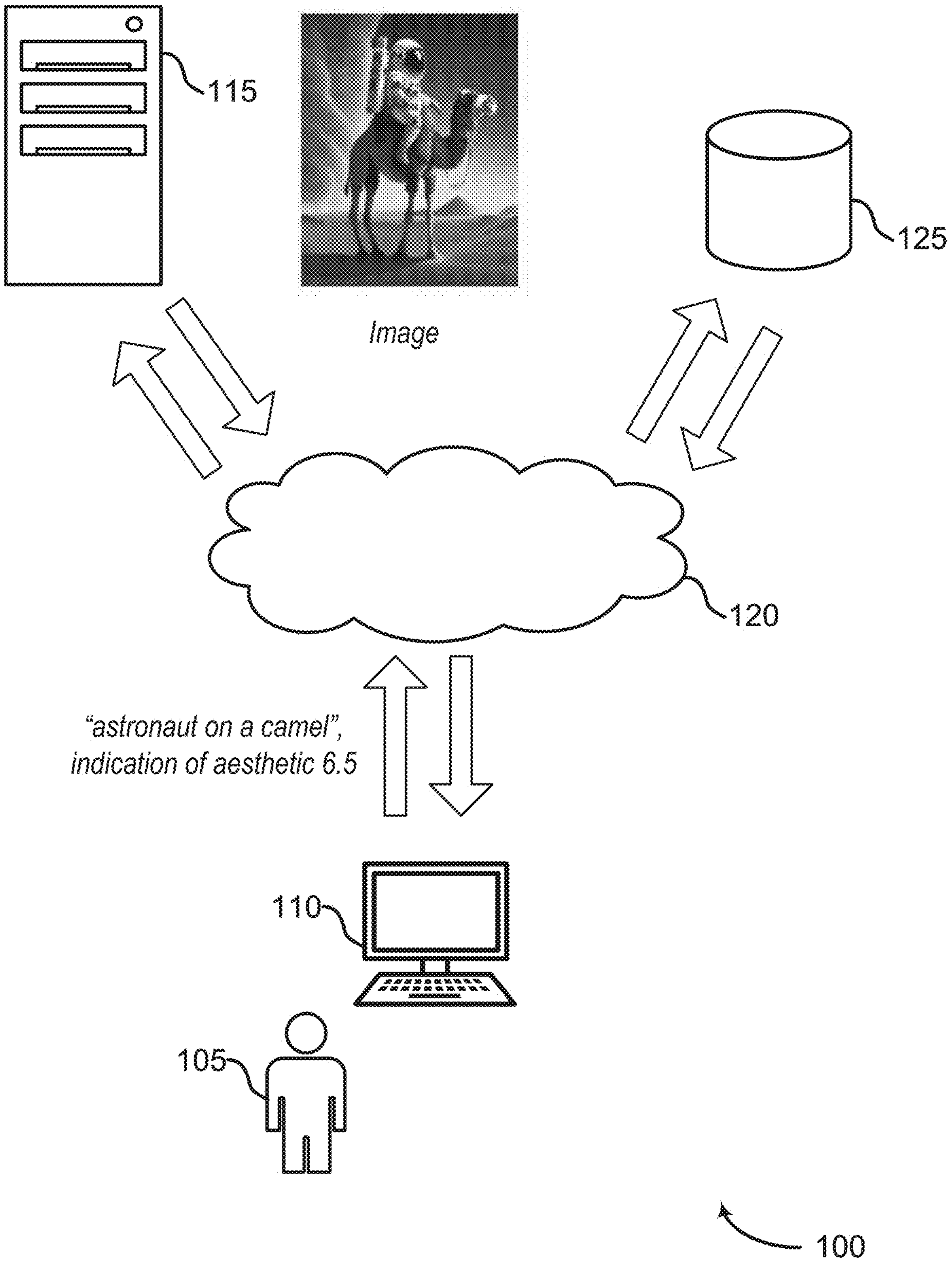
FIG. 1 shows an example of an image generation system according to aspects of the present disclosure.

A machine learning model can be trained to predict information for an image in response to an input prompt, and to then generate the image based on the predicted information. In some cases, the input prompt can be a text prompt that describes an element of the image, such as an item to be depicted, or a style of the depiction. Text-based image generation generates an image without the use of an original image as an input, and therefore makes image generation easier for a layperson (e.g., a user) and also more readily automated.

Using human-tangible feedback for finetuning a text-to-image image generation model (such as a diffusion model) is a challenging task. Conventional methods rely on tuning training data based on feedback. For example, training data is adjusted by adding additional training data specific to the feedback, which is expensive, or reinforcement learning-based finetuning is used to fine-tune the image generation model.

Reinforcement learning relates to how software agents make decisions to maximize a reward. A reinforcement learning decision-making model may be referred to as a policy. Reinforcement learning balances the exploration of unknown options and the exploitation of existing knowledge. In some cases, a reinforcement learning environment is stated in a form of a Markov decision process (MDP). Furthermore, many reinforcement learning algorithms use dynamic programming techniques. One difference between reinforcement learning and other dynamic programming methods is that reinforcement learning does not require an exact mathematical model of the MDP. Therefore, reinforcement learning models may be used for large MDPs where exact methods are impractical.

However, reinforcement learning algorithms are unstable to train in an image generation context due to sensitivity and constrained applicability to some image generation models such as diffusion models. Resource requirements for reinforcement learning in an image generation context are also very high, as a reinforcement learning algorithm in an image generation context relies upon the simultaneous use of multiple models (e.g., a policy model, a reward model, and a reference model). For example, a reward needs to be computed at runtime by the reward model on a generated image, and then the reward needs to be backpropagated. Using reinforcement learning for finetuning on feedback also relies upon explicit reward modeling that needs to be computed and that poses constraints on feedback data.

According to some aspects, an image generation system of the present disclosure uses upside-down reinforcement learning by providing a "reward" (e.g., an objective text) as part of input conditioning for finetuning an image generation model. In some cases, the objective text is provided based on an output of a classifier model for a training image. In some cases, the objective text is provided by manually annotating the training image. In some cases, the objective text heavily reduces resource requirements when compared to the resource requirements for conventional reinforcement learning. For example, in some cases, using the objective text as input conditioning for the image generation model avoids using resource-expensive and high-latency reinforcement learning algorithms for training the image generation model.

In some cases, the objective text modifies a text input used for training the image generation model, thereby making the "reward" as part of an input text condition for training the image generation model. In some cases, the "reward" can be a human-understandable label, unlike reward requirements for conventional reinforcement learning training approaches for image generation models.

The present disclosure describes systems and methods that generate images more accurately and more efficiently than conventional image generation models. For example, embodiments of the present disclosure enable the generation of more aesthetically pleasing images (or images having other target characteristics) with less training. Some embodiments of the present disclosure are capable of generating images with a variety of characteristics. In some cases, the image generation model can be trained without the extensive iterative training associated with reinforcement learning, even if the target characteristic is characterized by a reward mode.

In some aspects, the image generation model generates an image based on an augmented text prompt including an input text prompt and an objective text corresponding to an indication of a level of a target characteristic. The image generation model processes the augmented text prompt, and is able to generate the image such that the image depicts content described by the input text prompt and having the level of the target characteristic. Accordingly, a user can easily generate an image including a particular visual quality, and easily generate variants of the image depicting various degrees of the particular visual quality using the image generation model.

In one aspect, the image generation model can generate an image in a more efficient and directed manner than conventional image generation systems that do not understand a similar prompt including text relating to a target characteristic. For example, conventional image generation systems do not understand prompts including information relating to levels, degrees, or amounts of visual characteristics. As a result, a user of conventional image generation systems often resorts to repeatedly generating images until one of the generated images happens to align with the user's expectation of the visual characteristics of the image. According to some aspects, the image generation system of the present disclosure instead reduces an amount of undue experimentation by generating an image based on an understanding of a prompt-provided level, degrees, or amount of a visual characteristic, therefore providing a more efficient user experience than conventional image generation systems.

For example, "cubism 5.0; still life" and "cubism 1.0; still life" are examples of augmented text prompts including objective texts, where "still life" is an input text prompt, "cubism 5.0" and "cubism 1.0" are the objective texts, and 5.0/1.0 respectively indicate the levels of the target "cubism" characteristic. In some cases, based on the "cubism 5.0; still life" augmented text prompt, the image generation model generates an image depicting a still life scene having a high degree of a cubist style. In some cases, based on the "cubism 1.0, still life" augmented text prompt, the image generation model generates an image depicting a still life scene having a low degree of a cubist style. By contrast, conventional image generation models do not understand target levels included in the "cubism 5.0; still life" and "cubism 1.0; still life" augmented text prompts, and therefore may generate images based on the augmented text prompts that depict a still life scene with a cubist style, but without correspondence to the target levels included in the augmented text prompts.

An example of the image generation system is used in an image generation context. In the example, a classifier model trained to provide aesthetic scores for images receives a set of training images as input. The classifier model outputs a classifier score (e.g., aesthetic 2.0, aesthetic 3.0, etc.) for each training image of the set of training images. A training component appends a text description of each classifier score (e.g., a training objective text) to a training text input corresponding to each of the training images (e.g., "aesthetic 2.0; an astronaut riding a camel") to obtain an augmented text description. An image generation model generates an image based on the augmented text description and a corresponding training image. The training component trains the image generation model to generate images based on a comparison of the training image and the generated image.

In an example, a user provides an input text prompt (e.g., "a banana") to the image generation system via a user interface provided by the image generation system on a user device. The user also indicates a level (e.g., 3.0) of a target characteristic (e.g., an aesthetic) in the user interface (for example, via a slider of the user interface). The image generation system generates an augmented text prompt (e.g., "aesthetic 3.0; a banana") including the input text prompt and an objective text corresponding to the indication of the level of the target characteristic. For example, in some cases, the image generation system prepends the input text prompt with the objective text to obtain the augmented text prompt. The image generation system uses the trained image generation model to generate an image based on the augmented text prompt, where the image includes content described by the input text prompt and has the level of the target characteristic.

Further example applications of the present disclosure in the image generation context are provided with reference to FIGS. 1, 3-4, and 9-18. Details regarding the architecture of the image generation system are provided with reference to FIGS. 3, 5-8, and 22. Examples of a process for image generation are provided with reference to FIGS. 3-4 and 9-18. Examples of a process for training an image generation model are provided with reference to FIG. 19-21.

Embodiments of the present disclosure improve upon conventional image generation systems by generating an image according to a variable level of a target characteristic to be depicted in the image in a more reliable, efficient, and economical manner than conventional image generation systems. For example, some embodiments of the present disclosure use an image generation model to generate an image having a level of a target characteristic specified by a prompt, where the image generation model is trained on the level of the target characteristic. Accordingly, by generating the image using the trained image generation model, the image is provided with a precise and accurate level of the target characteristic. By contrast, conventional image generation models rely on reinforcement learning techniques to train image generation models to have comparable qualities, and reinforcement learning is time-consuming, expensive, and unreliable.

Image Generation System

A system and an apparatus for image generation using machine learning are described with reference to FIGS. 1, 5-8, and 22. One or more aspects of the system and the apparatus include one or more processors and one or more memory components coupled with the one or more processors. One or more aspects of the system and the apparatus further include an augmentation component configured to add an objective text to an input text prompt to obtain an augmented text prompt, where the objective text indicates a level of a target characteristic identified from a set of target characteristics. One or more aspects of the system and the apparatus further include an image generation model comprising image generation parameters stored in the one or more memory components, the image generation model trained to generate an image based on the augmented text prompt and the set of target characteristics, wherein the image depicts content of the input text prompt and has the level of the target characteristic.

Some examples of the system and the apparatus further include a classifier model comprising classification parameters stored in the one or more memory components, the classifier model trained to determine the level of the target characteristic. Some examples of the system and the apparatus further include a language generation model comprising language generation parameters stored in the one or more memory components, the language generation model configured to generate the objective text based on an output of the classifier model.

Some examples of the system and the apparatus further include an encoder comprising encoding parameters stored in the one or more memory components, the encoder configured to encode the augmented text prompt to obtain a text embedding. Some examples of the system and the apparatus further include a user interface configured to obtain the text prompt from a user.

Some examples of the system and the apparatus further include a training component configured to train the image generation model using annotated training data including a training image that is labeled based on the target characteristic and a training prompt corresponding to the training image. In some aspects, the training prompt includes training objective text at a same location as the objective text within the augmented text prompt.

FIG. 1 shows an example of an image generation system 100 according to aspects of the present disclosure. The example shown includes image generation system 100, user 105, user device 110, image generation apparatus 115, cloud 120, and database 125. Image generation system 100 is an example of, or includes aspects of, the corresponding element described with reference to FIGS. 6 and 20.

Referring to FIG. 1, in an example, user 105 provides an input text prompt (e.g., "astronaut on a camel") and an indication of a target level (e.g., 6.5) of a target characteristic (e.g., an aesthetic) to image generation apparatus 115 via a user interface provided on user device 110 by image generation apparatus 115. In response, image generation apparatus 115 generates an augmented text prompt including the input text prompt and an objective text corresponding to the indication of the level of the target characteristic (e.g., "aesthetic 6.5; astronaut on a camel") and generates an image based on the augmented text prompt, where the image depicts content described by the input text prompt and having the level of the target characteristic. For example, an image generated based on the augmented text prompt "aesthetic 6.5; astronaut on a camel" depicts an astronaut riding on a camel with detail reflective of a high aesthetic level. Image generation apparatus 115 provides the image to user 105 via the user interface.

As used herein, a "text prompt" refers to a text (e.g., natural language) description information that is used to inform an intended output of a machine learning model, such that the output depicts content described by the prompt.

As used herein, in some cases, an "objective text" and a "training objective text" refer to text that corresponds to an indication of a level of a target characteristic. In some cases, a "target characteristic" refers to a characteristic that is intended to be depicted in an image generated by an image generation model. For example, in some cases, examples of objective texts describing characteristics include "aesthetic", "plus", "minus", "[number] [of objects]" (where a particular object can be specified), etc. In some cases, how the characteristic is depicted in the image is determined by how the image generation model is trained to interpret the meaning of the characteristic. In some cases, a classifier model is trained to make a prediction for an input image relating to a characteristic.

In some cases, a "level" refers to a degree to which a characteristic is depicted in an image generated by the image generation model. In some cases, a level is relative with respect to a range of levels. In some cases, the image generation model is trained to understand the range of levels based on training data. In some cases, a level is an integer. In some cases, a level is a floating-point number. In some cases, a level is a positive number. In some cases, a level is a negative number. In some cases, a level is 0. In some cases, examples of objective texts describing a level for a target characteristic include "aesthetic 3.0", "plus 2", "minus 1", "three dogs" (with "dogs" being "objects"), etc. In some cases, a classifier model is trained to make a prediction (e.g., a value) for an input image relating to a level of a characteristic present in the input image.

As used herein, an "embedding" refers to a mathematical representation of an input in a lower-dimensional space such that information about the input is more easily captured and analyzed by the machine learning model. For example, in some cases, an embedding is a numerical representation of the input in a continuous vector space in which objects that have similar semantic information correspond to vectors that are numerically similar to and thus "closer" to each other, allowing machine learning model to effectively compare different objects corresponding to different embeddings with each other.

According to some aspects, user device 110 is a personal computer, laptop computer, mainframe computer, palmtop computer, personal assistant, mobile device, or any other suitable processing apparatus. In some examples, user device 110 includes software that displays a user interface (e.g., a graphical user interface) provided by image generation apparatus 115. In some aspects, the user interface allows information (such as an image, a prompt, user inputs, etc.) to be communicated between user 105 and image generation apparatus 115.

According to some aspects, a user device user interface enables user 105 to interact with user device 110. In some embodiments, the user device user interface may include an audio device, such as an external speaker system, an external display device such as a display screen, or an input device (e.g., a remote-control device interfaced with the user interface directly or through an I/O controller module). In some cases, the user device user interface may be a graphical user interface.

Image generation apparatus 115 is an example of, or includes aspects of, the corresponding element described with reference to FIGS. 5 and 22. According to some aspects, image generation apparatus 115 includes a computer-implemented network. In some embodiments, the computer-implemented network includes a machine learning model (such as the image generation model described with reference to FIGS. 5-6 and 20). In some embodiments, image generation apparatus 115 also includes one or more processors, a memory subsystem, a communication interface, an I/O interface, one or more user interface components, and a bus as described with reference to FIG. 22. Additionally, in some embodiments, image generation apparatus 115 communicates with user device 110 and database 125 via cloud 120.

In some cases, image generation apparatus 115 is implemented on a server. A server provides one or more functions to users linked by way of one or more of various networks, such as cloud 120. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, the server is configured to send and receive hypertext markup language (HTML) formatted files (e.g., for displaying web pages). In various embodiments, the server comprises a general-purpose computing device, a personal computer, a laptop computer, a mainframe computer, a supercomputer, or any other suitable processing apparatus.

Further detail regarding the architecture of image generation apparatus 115 is provided with reference to FIGS. 3, 5-8 and 22. Further detail regarding a process for image generation is provided with reference to FIGS. 3-4 and 9-18. Examples of a process for training a diffusion model are provided with reference to FIG. 19-21.

Cloud 120 is a computer network configured to provide on-demand availability of computer system resources, such as data storage and computing power. In some examples, cloud 120 provides resources without active management by a user. The term "cloud" is sometimes used to describe data centers available to many users over the Internet. Some large cloud networks have functions distributed over multiple locations from central servers. A server is designated an edge server if the server has a direct or close connection to a user. In some cases, cloud 120 is limited to a single organization. In other examples, cloud 120 is available to many organizations. In one example, cloud 120 includes a multi-layer communications network comprising multiple edge routers and core routers. In another example, cloud 120 is based on a local collection of switches in a single physical location. According to some aspects, cloud 120 provides communications between user device 110, image generation apparatus 115, and database 125.

Database 125 is an organized collection of data. In an example, database 125 stores data in a specified format known as a schema. According to some aspects, database 125 is structured as a single database, a distributed database, multiple distributed databases, or an emergency backup database. In some cases, a database controller manages data storage and processing in database 125. In some cases, a user interacts with the database controller. In other cases, the database controller operates automatically without interaction from the user. According to some aspects, database 125 is external to image generation apparatus 115 and communicates with image generation apparatus 115 via cloud 120. According to some aspects, database 125 is included in image generation apparatus 115.

Figure 2:
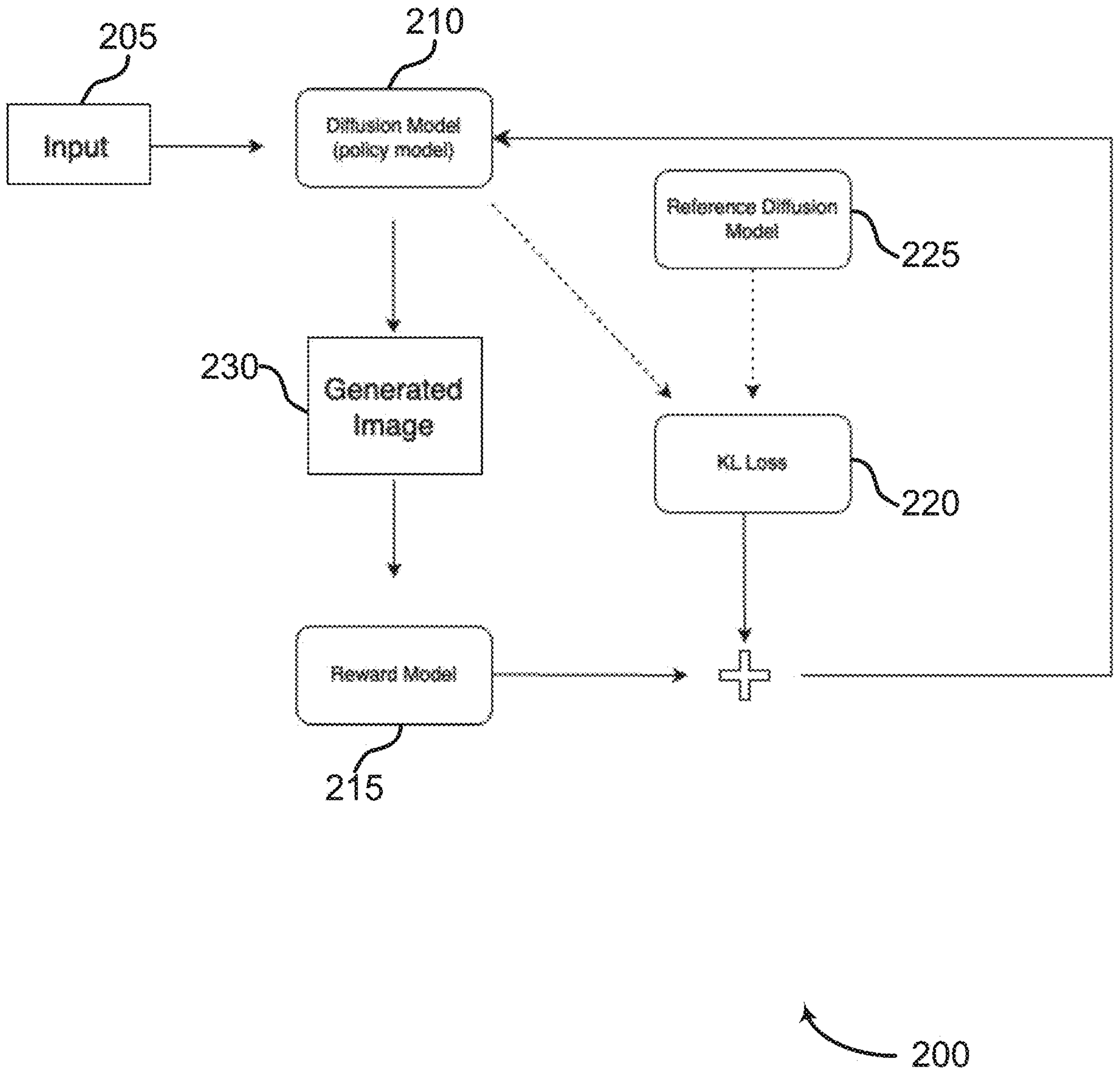
FIG. 2 shows an example of a reinforcement learning training pipeline according to aspects of the present disclosure.

FIG. 2 shows an example of a reinforcement learning training pipeline 200 according to aspects of the present disclosure. In one aspect, a reinforcement learning training pipeline 200 includes input 205, diffusion model 210, reward model 215, KL loss 220, reference diffusion model 225, and generated image 230. In some cases, conventional image generation models may be trained using a reinforcement learning pipeline only. By contrast, embodiments of the present disclosure may use a reinforcement learning pipeline for pretraining an image generation model (such as the image generation model described with reference to FIGS. 5-6 and 20). Additionally or alternatively, embodiments of the present disclosure may use an alternative training process described with reference to FIGS. 19-21.

Referring to FIG. 2, a reinforcement learning mechanism for an image generation model (e.g., diffusion model 210 or a policy model) computes a reward on generated image 230 at training time for each text-image training pair (e.g., input 205) and then attempts to backpropagate the reward. Reinforcement learning training pipeline 200 includes an additional copy of an image generation model (e.g., reference diffusion model 225) to be loaded in memory for KL divergence (e.g., KL loss 220). Reinforcement learning training pipeline 200 also includes reward model 215, which runs inference on each generated image 230 to provide a reward metric. As a result, in some cases, a processing time for reinforcement learning training pipeline 200 is long.

By contrast, some embodiments of the present disclosure modify an input text condition directly using a training objective text (e.g., a "reward") and omit a use of a reward model or a reference model at training time. For example, in some cases, by encoding an augmented training prompt using an encoder (such as the text encoder described with reference to FIGS. 5, 7, and 20) to obtain a training text embedding, a reward type is therefore defined and made part of an input condition for the image generation model that provides sufficient context to the image generation model for training and generating images that reflect the reward specified at inference time. In some cases, the encoder comprises a large language model having a semantic understanding of the augmented training prompt.

Figure 3:
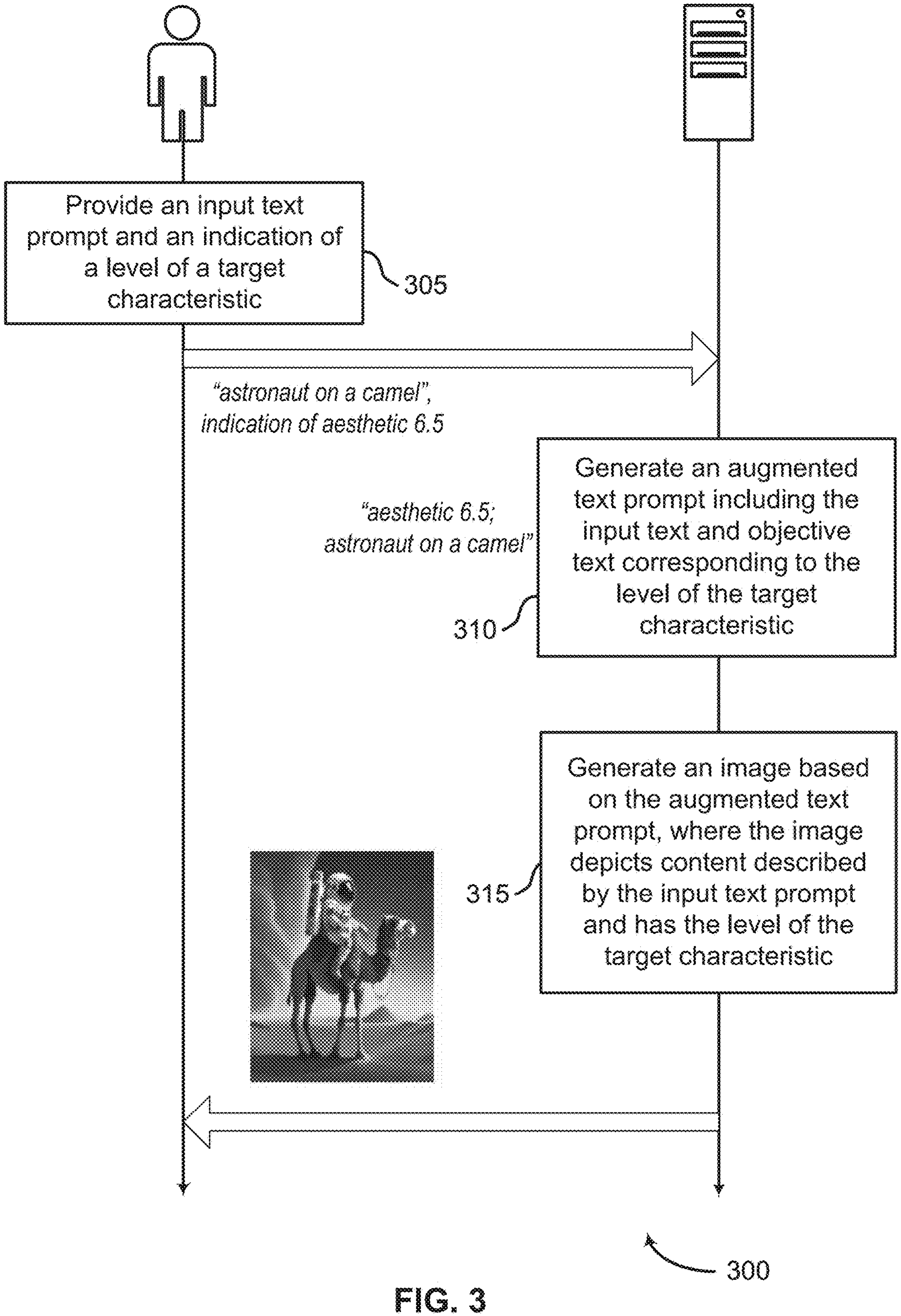
FIG. 3 shows an example of a method for generating an image according to aspects of the present disclosure.

FIG. 3 shows an example of a method 300 for generating an image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 3, in some cases, a user (such as the user described with reference to FIG. 1) provides an input text prompt and an indication of a level of a target characteristic to an image generation system (such as the image generation system described with reference to FIG. 1). The image generation system generates an augmented text prompt including the input text prompt and objective text corresponding to the indication of the level of the target characteristic, and generates an image based on the augmented text prompt, where the image depicts content described by the input text prompt and has the level of the target characteristic. Accordingly, in some cases, the image generation system allows the user to control an amount of a visual characteristic present in a generated image in a more direct manner than conventional image generation systems, which rely on a trial-and-error approach to generate images having specific visual characteristics.

At operation 305, a user provides an input text prompt (e.g., astronaut on a camel") describing prospective content of an image to be generated, as well as an indication of a level (e.g., 6.5) of a target characteristic (e.g., aesthetic), to the image generation system. In some cases, the operations of this step refer to, or may be performed by, a user as described with reference to FIG. 1. For example, in some cases, the user provides the input text prompt and the indication of the level of the target characteristic to the image generation system via a user interface displayed on a user device (such as the user device described with reference to FIG. 1) by an image generation apparatus of the image generation system (such as the image generation apparatus described with reference to FIGS. 1 and 5).

In some cases, the input text prompt includes text (e.g., natural language text) describing content for an image. In some cases, the user provides the input text prompt to a text box of the user interface. In some cases, the user provides the indication of the level of the target characteristic via an input to an element of the user interface, such as a slider. In some cases, the user selects the target characteristic via another element of the user interface (such as a drop-down menu). In some cases, the target characteristic is a characteristic used to train an image generation model (such as the image generation model described with reference to FIGS. 5-6 and 20).

At operation 310, the system generates an augmented text prompt (e.g., "aesthetic 6.5; astronaut on a camel") including the input text prompt (e.g., "astronaut on a camel") and objective text (e.g., "aesthetic 6.5") corresponding to the level of the target characteristic. In some cases, the operations of this step refer to, or may be performed by, an image generation apparatus as described with reference to FIGS. 1 and 5. For example, in some cases, the image generation apparatus generates the augmented text prompt as described with reference to FIG. 9.

At operation 315, the system generates an image based on the augmented text prompt, where the image depicts content described by the input text prompt and has the level of the target characteristic. In some cases, the operations of this step refer to, or may be performed by, an image generation apparatus as described with reference to FIGS. 1 and 5. For example, in some cases, the image generation apparatus generates the image as described with reference to FIGS. 9-11. In some cases, for example, the image depicts an astronaut riding on a camel with detail reflective of a high aesthetic level (e.g., 6.5). In some cases, the image generation apparatus generates multiple images depicting variants of the image depicting various degrees of the particular visual quality. In some cases, the image generation apparatus provides the image to the user via the user interface.

Figure 4:
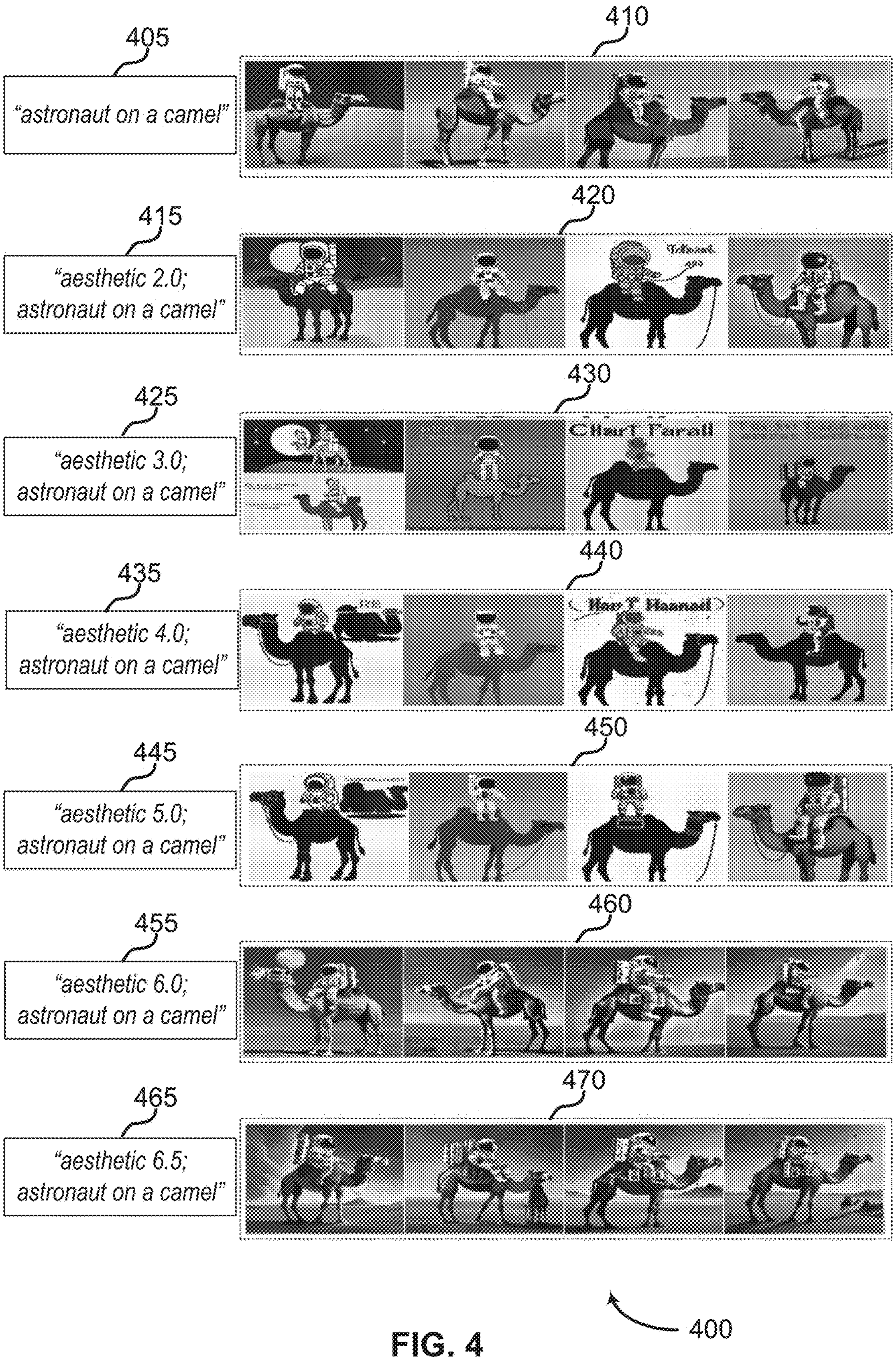
FIG. 4 shows a first example of images generated based on an augmented text prompt according to aspects of the present disclosure.

FIG. 4 shows a first example 400 of images generated based on an augmented text prompt according to aspects of the present disclosure. The example shown includes input text prompt 405, first set of images 410, first augmented text prompt 415, second set of images 420, second augmented text prompt 425, third set of images 430, third augmented text prompt 435, fourth set of images 440, fourth augmented text prompt 445, fifth set of images 450, fifth augmented text prompt 455, sixth set of images 460, sixth augmented text prompt 465, and seventh set of images 470.

Referring to FIG. 4, first augmented text prompt 415, second augmented text prompt 425, third augmented text prompt 435, fourth set of images 440, fourth augmented text prompt 445, fifth augmented text prompt 455, and sixth augmented text prompt 465 are examples of augmented text prompts obtained by an adding objective text (e.g., "aesthetic 2.0", "aesthetic 3.0", "aesthetic 4.0", "aesthetic 5.0", "aesthetic 6.0", and "aesthetic 6.5") to input text prompt 405 (e.g., "astronaut on a camel"). First set of images 410, second set of images 420, third set of images 430, fourth set of images 440, fifth set of images 450, sixth set of images 460, and seventh set of images 470 include examples of images respectively generated by an image generation model (such as the image generation model described with reference to FIGS. 5-6 and 20) based on input text prompt 405, first augmented text prompt 415, second augmented text prompt 425, third augmented text prompt 435, fourth set of images 440, fourth augmented text prompt 445, fifth augmented text prompt 455, and sixth augmented text prompt 465.

In the example of FIG. 4, the image generation model has been trained (for example, as described with reference to FIGS. 19-21) to generate images having a level of an aesthetic characteristic specified by an augmented text prompt having a format of "aesthetic [level]; [input text prompt]". As shown in FIG. 4, as the level of the target aesthetic characteristic increases (e.g., from 2.0 to 6.5), visual qualities in the respectively generated images change according to the image generation model's training. For example, images in seventh set of images 470, generated based on sixth augmented text prompt 465, are more aesthetic (according to the image generation model's learned understanding of the aesthetic characteristic) than second set of images 420 generated based on first augmented text prompt 415. In some cases, for example, features of the aesthetic characteristic include composition, detail, color combination, contrast, texture, saturation, etc.

Referring to FIG. 4, vertically aligned images depict structurally similar images as each other. In some cases, this is accomplished by providing a seed (a number) as input to the image generation model, such that images generated based on the seed include similarities to each other.

Figure 12:
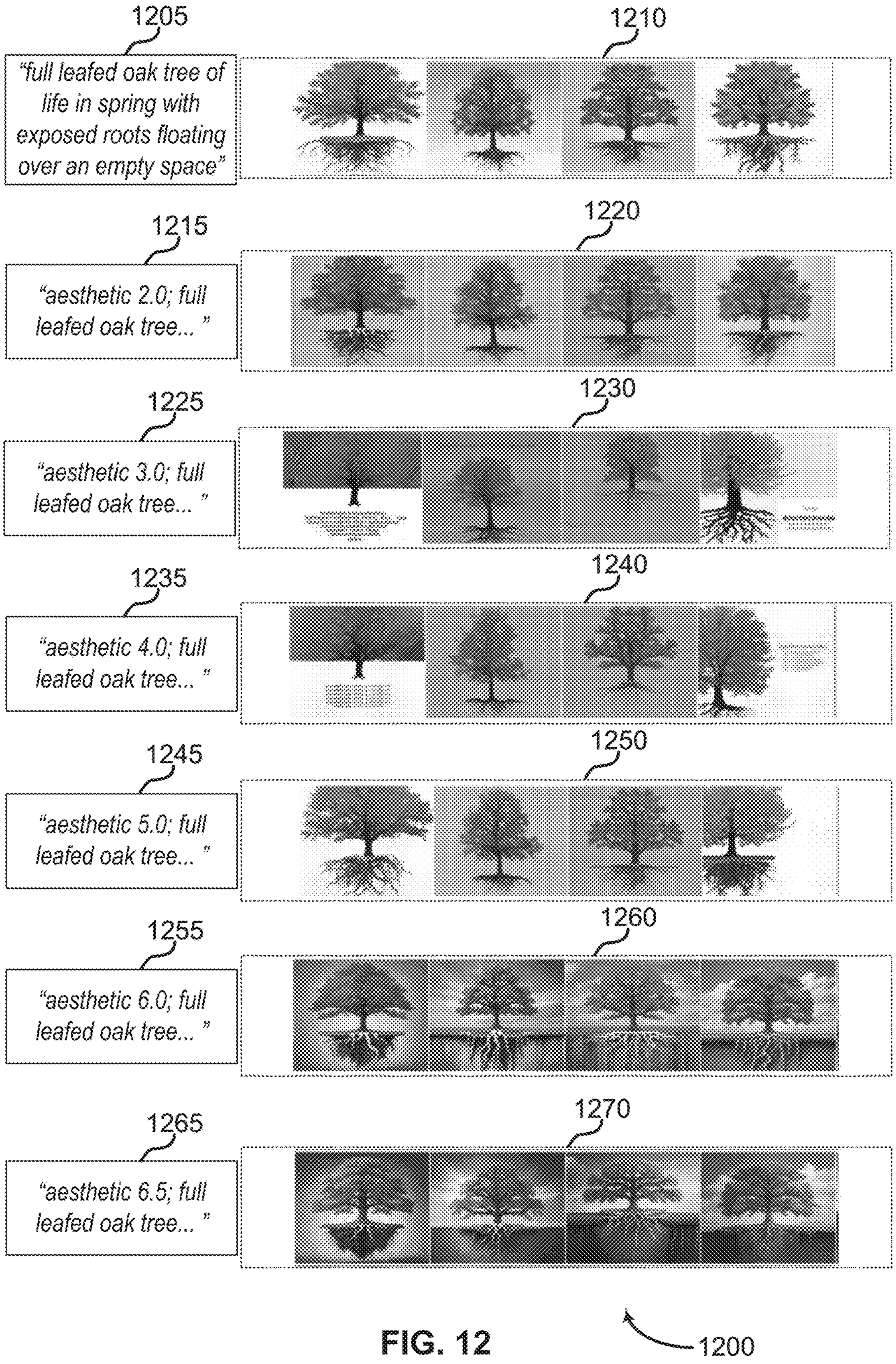
FIGS. 12-18 show examples of images generated based on augmented text prompts according to aspects of the present disclosure.
Figure 13:
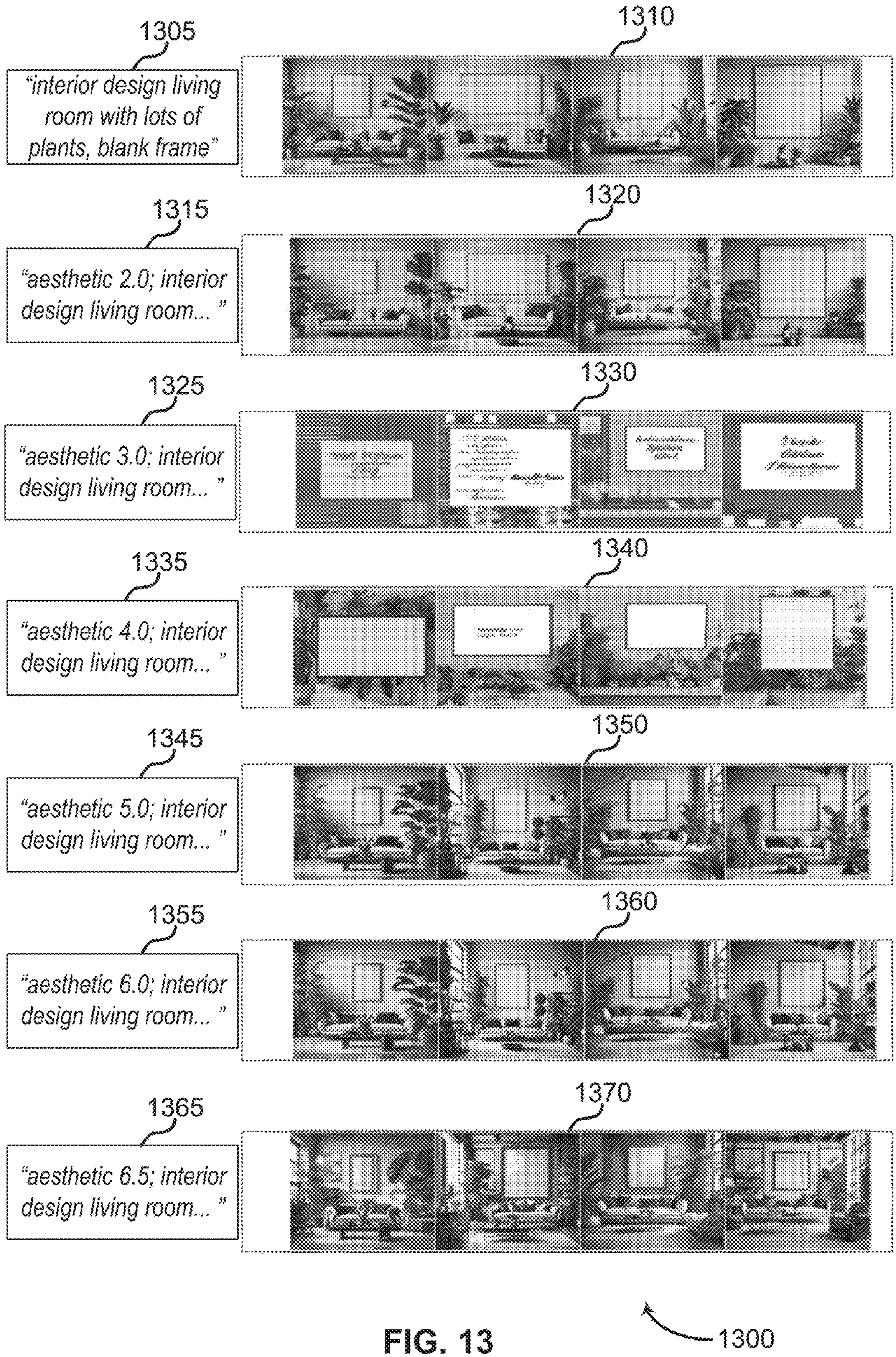
Figure 14:
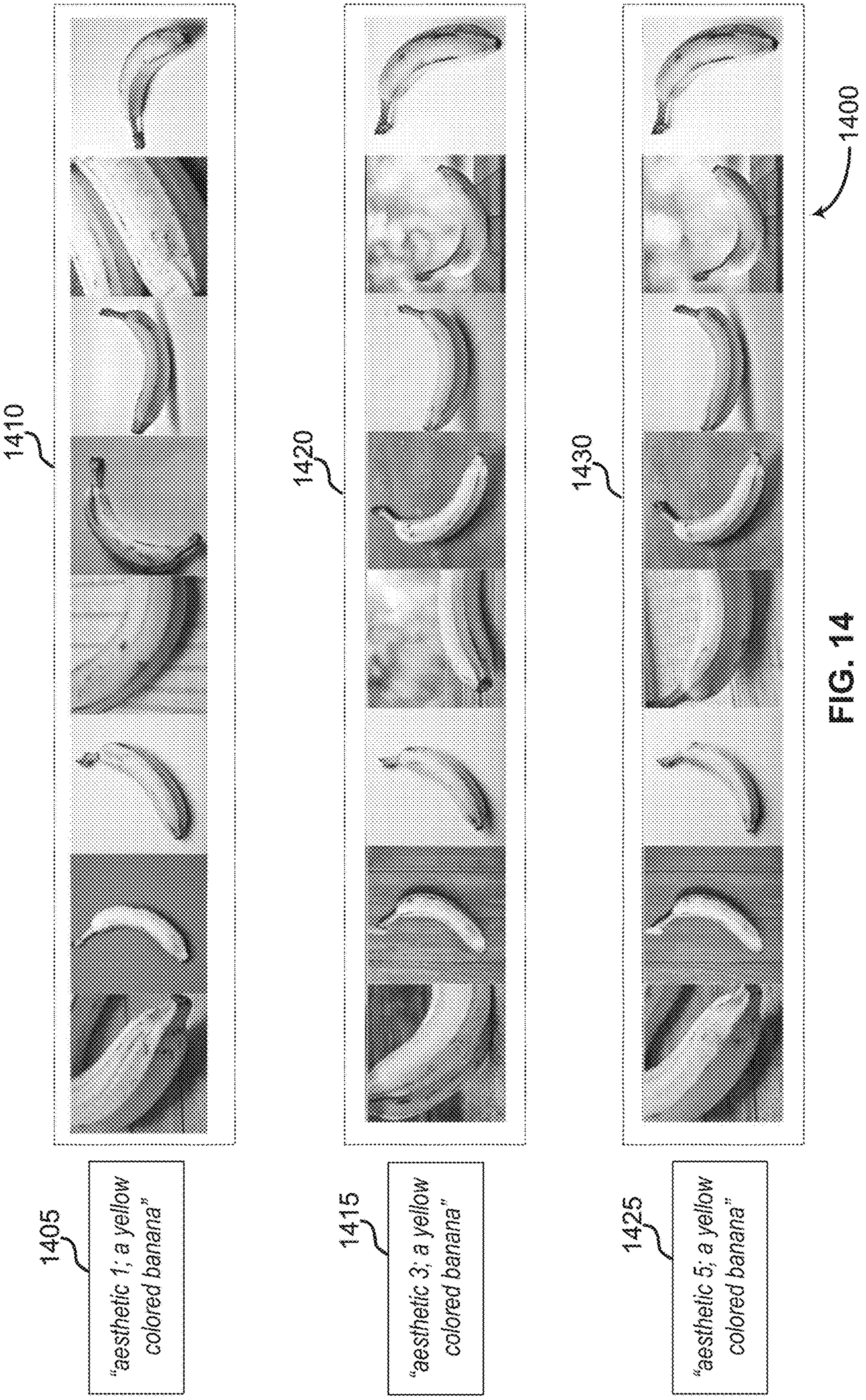
Figure 15:
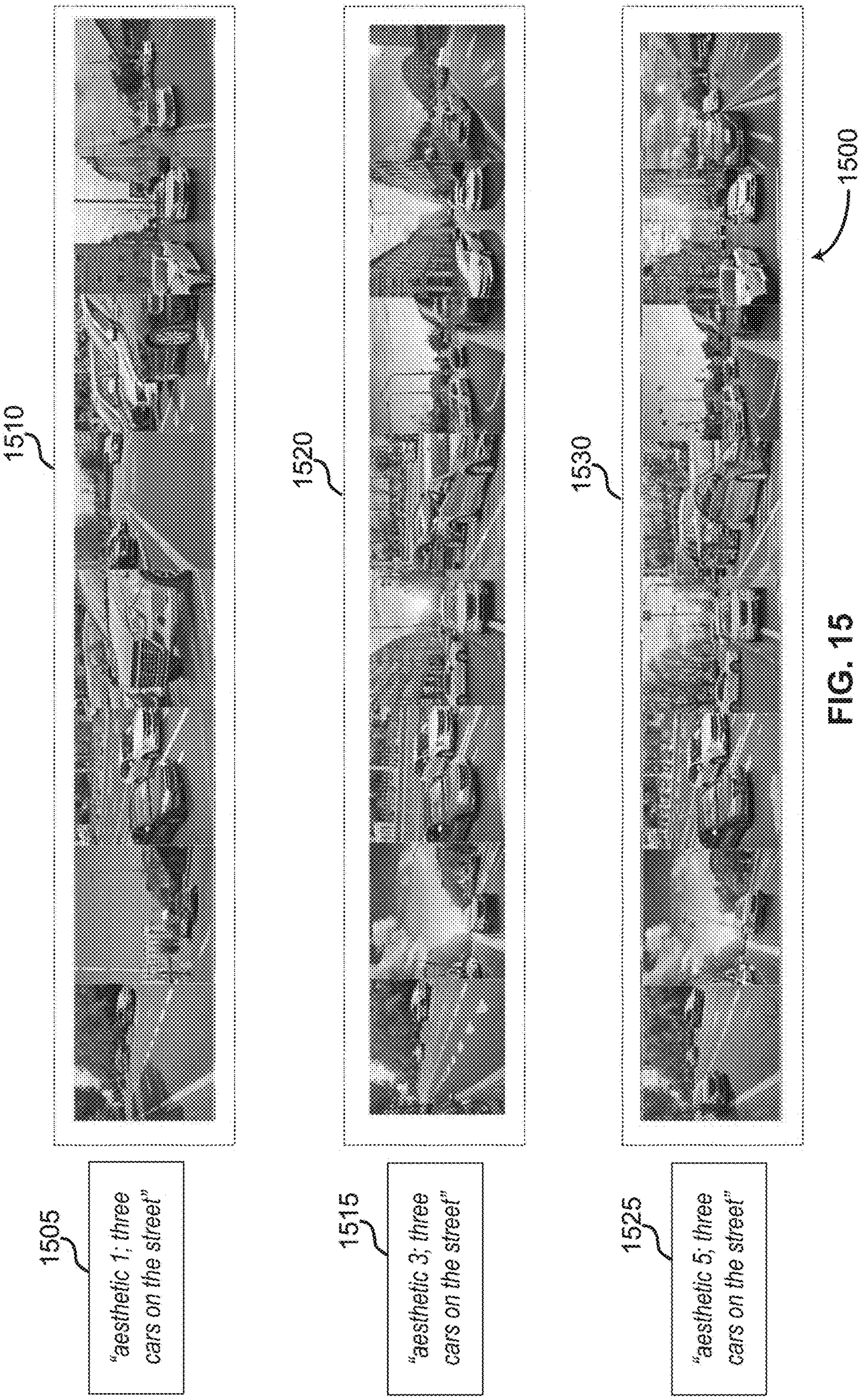
Figure 16:
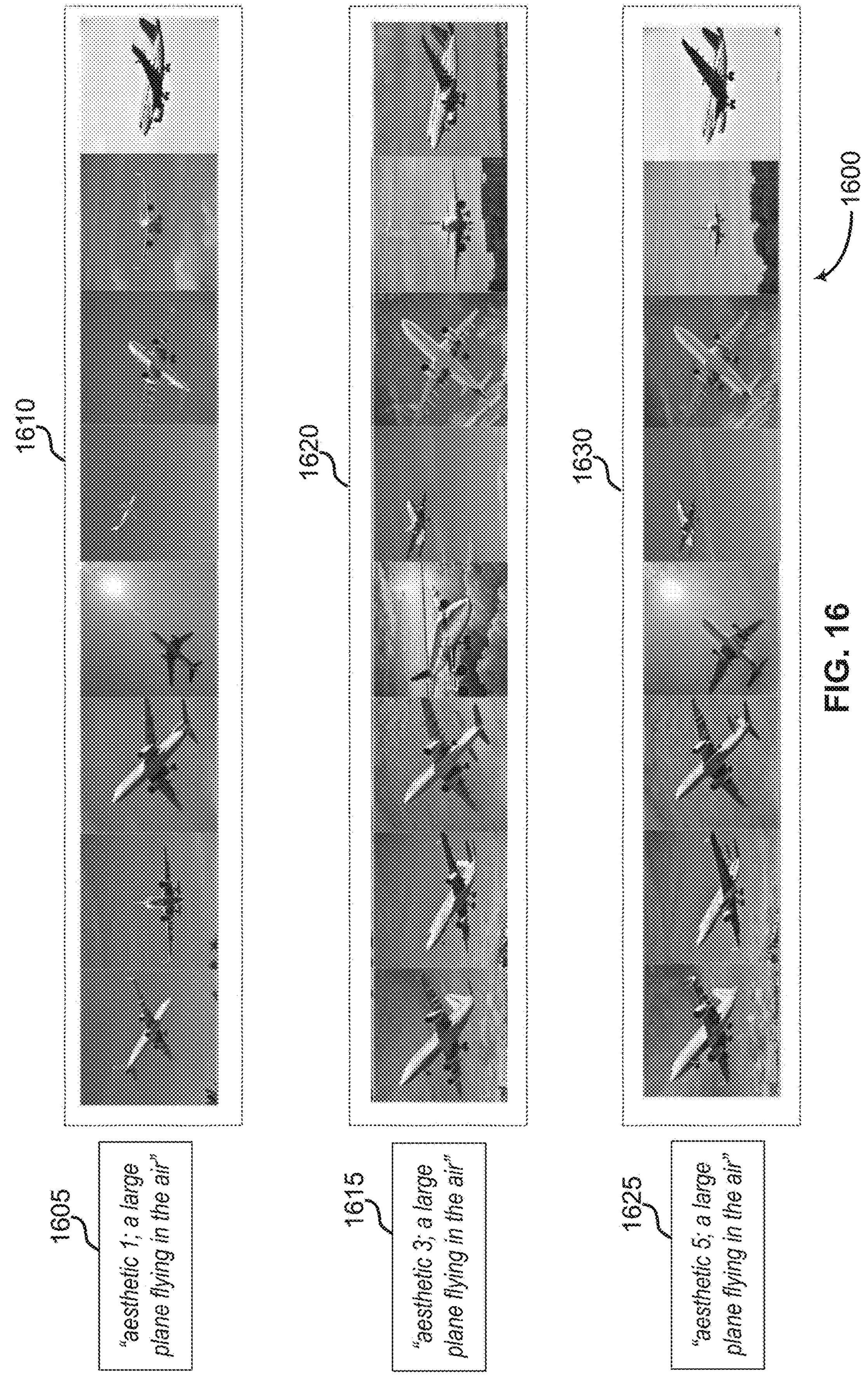
Figure 17:
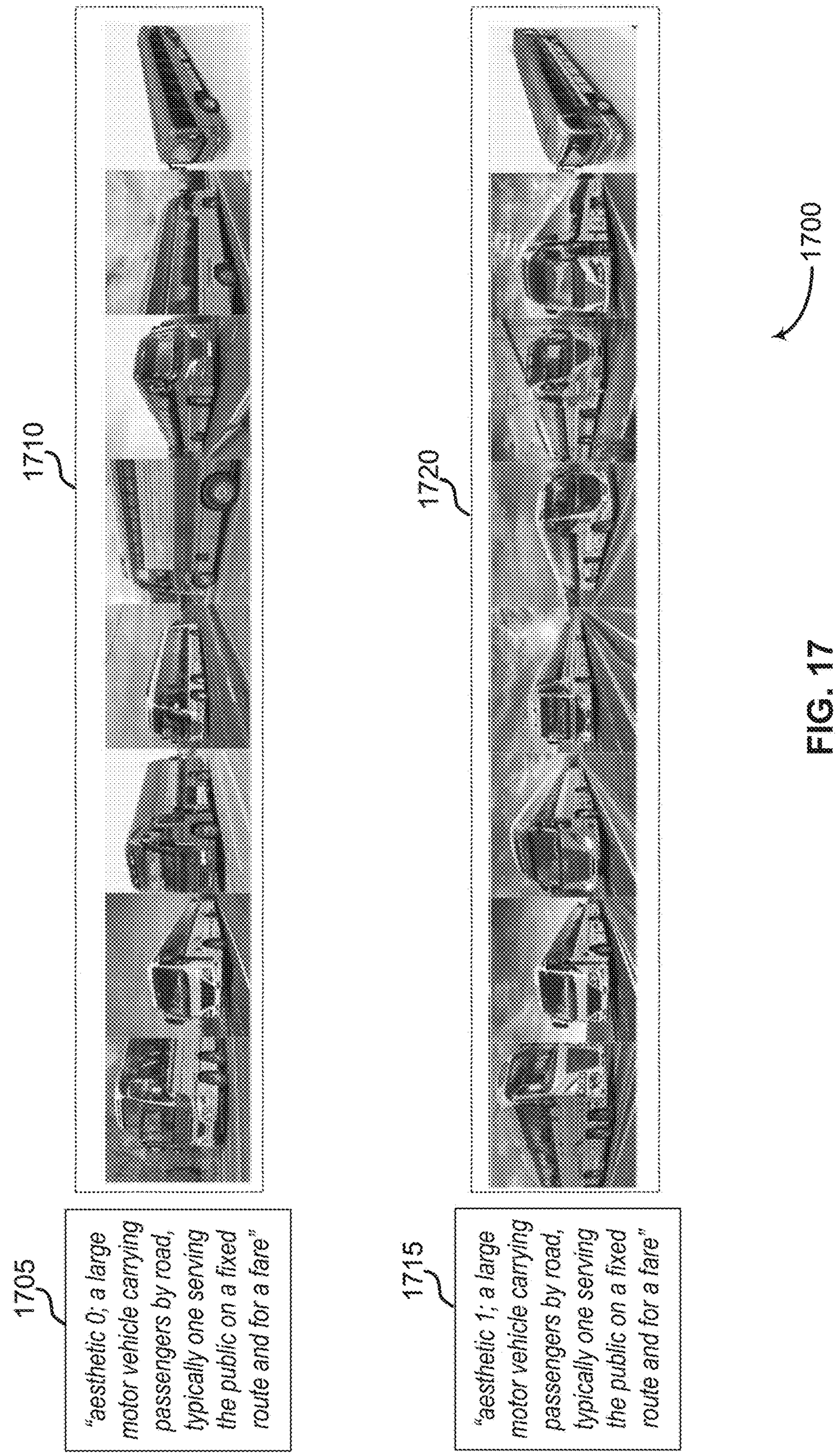
Figure 18:
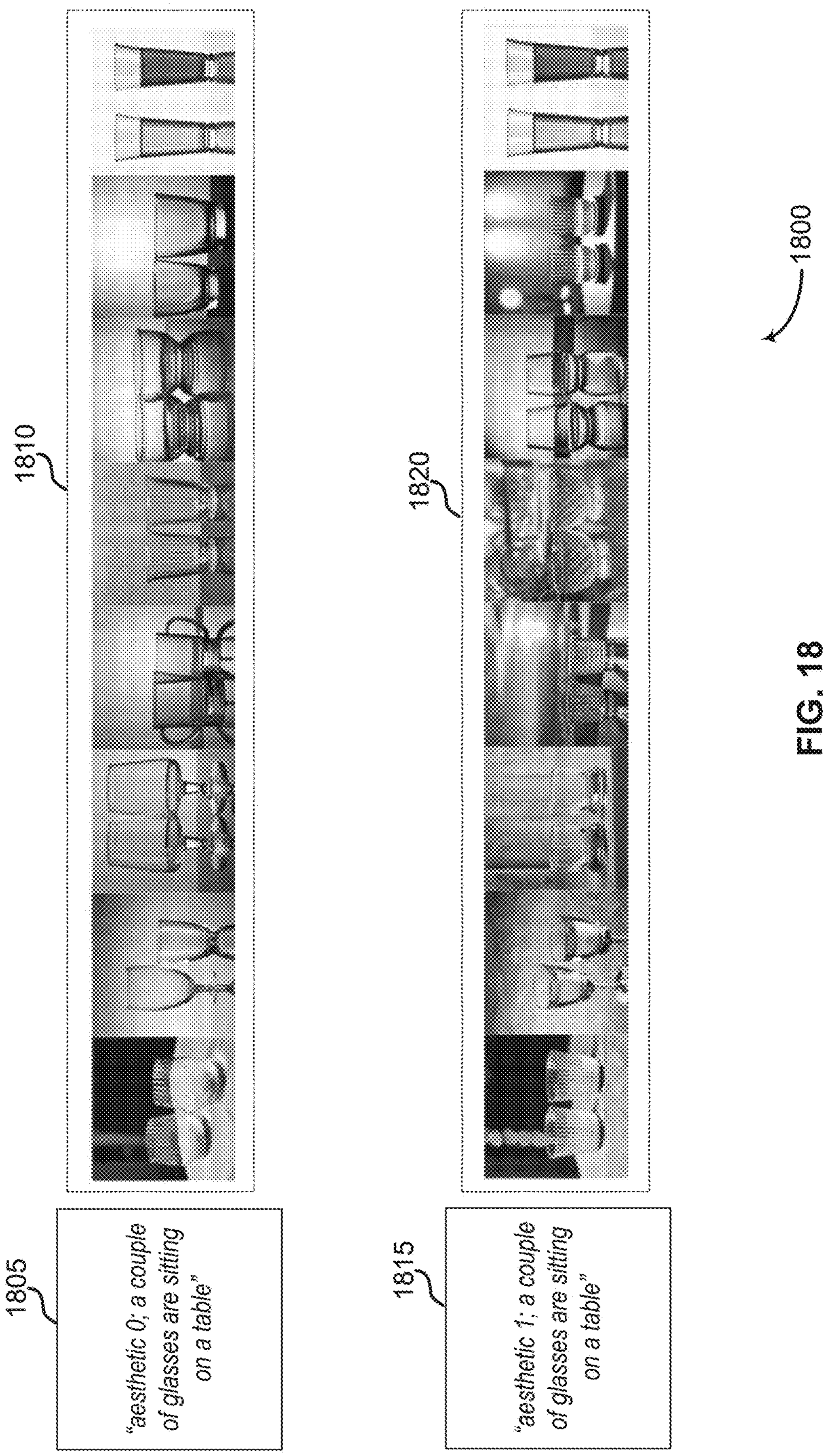

Similar examples of images generated using augmented text prompts including objective texts corresponding to levels of a target characteristic ranging from 2.0 to 6.5 are shown in FIGS. 12-13. Similar examples of images generated using augmented text prompts including objective texts corresponding to levels of a target characteristic ranging from 1 to 5 are shown in FIGS. 14-16. Similar examples of images using augmented text prompts including objective texts corresponding to levels of a target characteristic ranging from 0 to 1 are shown in FIGS. 17-18.

Figure 5:
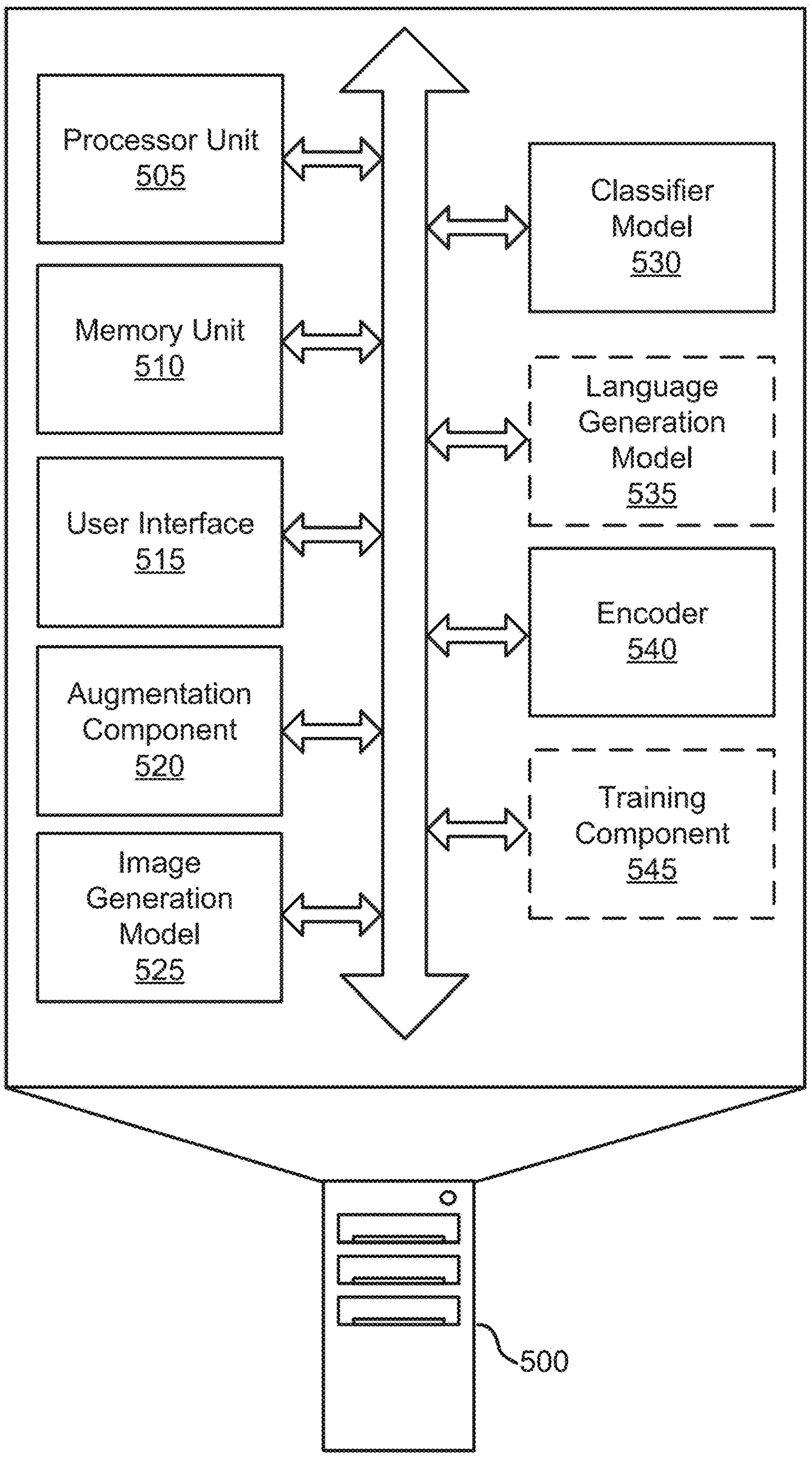
FIG. 5 shows an example of an image generation apparatus according to aspects of the present disclosure.

FIG. 5 shows an example of an image generation apparatus 500 according to aspects of the present disclosure. Image generation apparatus 500 is an example of, or includes aspects of, the corresponding element described with reference to FIG. 1. Image generation apparatus 500 is an example of, or includes aspects of, the computing device described with reference to FIG. 22. In one aspect, image generation apparatus 500 includes processor unit 505, memory unit 510, user interface 515, augmentation component 520, image generation model 525, classifier model 530, language generation model 535, encoder 540, and training component 545.

Processor unit 505 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof.

In some cases, processor unit 505 is configured to operate a memory array using a memory controller. In other cases, a memory controller is integrated into processor unit 505. In some cases, processor unit 505 is configured to execute computer-readable instructions stored in memory unit 510 to perform various functions. In some aspects, processor unit 505 includes special purpose components for modem processing, baseband processing, digital signal processing, or transmission processing. According to some aspects, processor unit 505 comprises the one or more processors described with reference to FIG. 22.

Memory unit 510 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause at least one processor of processor unit 505 to perform various functions described herein.

In some cases, memory unit 510 includes a basic input/output system (BIOS) that controls basic hardware or software operations, such as an interaction with peripheral components or devices. In some cases, memory unit 510 includes a memory controller that operates memory cells of memory unit 510. For example, the memory controller may include a row decoder, column decoder, or both. In some cases, memory cells within memory unit 510 store information in the form of a logical state. According to some aspects, memory unit 510 comprises the memory subsystem described with reference to FIG. 22.

According to some aspects, user interface 515 is implemented as software stored in memory unit 510 and executable by processor unit 505. According to some aspects, user interface 515 obtains an input text prompt. According to some aspects, user interface 515 obtains an indication of a level of a target characteristic. According to some aspects, the target characteristic comprises a characteristic used to train image generation model 525. According to some aspects, user interface 515 obtains a prompt including text describing content and objective text describing a level of a target characteristic. According to some aspects, user interface 515 obtains a target characteristic selected from a set of characteristics used to train image generation model 525.

Augmentation component 520 is an example of, or includes aspects of, the corresponding element described with reference to FIG. 6. According to some aspects, augmentation component 520 is implemented as software stored in memory unit 510 and executable by processor unit 505, as firmware, as one or more hardware circuits, or as a combination thereof.

According to some aspects, augmentation component 520 generates an augmented text prompt comprising the input text prompt and an objective text corresponding to the indication of the level of the target characteristic. According to some aspects, augmentation component 520 obtains the objective text based on the indication of the level of the target characteristic. According to some aspects, augmentation component 520 adds the objective text to the input text prompt to obtain the augmented text prompt. In some cases, the objective text describes the target characteristic and the level of the target characteristic. In some aspects, the objective text indicates a level of image quality. In some aspects, the objective text indicates a number of objects described by the input text prompt. In some cases, generating the augmented text prompt comprises prepending the objective text to the input text prompt.

Image generation model 525 is an example of, or includes aspects of, the corresponding element described with reference to FIGS. 6 and 20. According to some aspects, image generation model 525 is implemented as software stored in memory unit 510 and executable by processor unit 505, as firmware, as one or more hardware circuits, or as a combination thereof. According to some aspects, image generation model 525 comprises image generation parameters (e.g., machine learning parameters) stored in memory unit 510.

Machine learning parameters, also known as model parameters or weights, are variables that provide a behavior and characteristics of a machine learning model. Machine learning parameters can be learned or estimated from training data and are used to make predictions or perform tasks based on learned patterns and relationships in the data.

Machine learning parameters are adjusted during a training process to minimize a loss function or maximize a performance metric. The goal of the training process is to find optimal values for the parameters that allow the machine learning model to make accurate predictions or perform well on the given task.

For example, during the training process, an algorithm adjusts machine learning parameters to minimize an error or loss between predicted outputs and actual targets according to optimization techniques like gradient descent, stochastic gradient descent, or other optimization algorithms. Once the machine learning parameters are learned from the training data, the machine learning parameters are used to make predictions on new, unseen data.

Artificial neural networks (ANNs) have numerous parameters, including weights and biases associated with each neuron in the network, which control a degree of connections between neurons and influence the neural network's ability to capture complex patterns in data.

An ANN is a hardware component or a software component that includes a number of connected nodes (i.e., artificial neurons) that loosely correspond to the neurons in a human brain. Each connection, or edge, transmits a signal from one node to another (like the physical synapses in a brain). When a node receives a signal, the node processes the signal and then transmits the processed signal to other connected nodes.

In some cases, the signals between nodes comprise real numbers, and the output of each node is computed by a function of the sum of the inputs of each node. In some examples, nodes may determine the output using other mathematical algorithms, such as selecting the max from the inputs as the output, or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the ANN. Hidden representations are machine-readable data representations of an input that are learned from hidden layers of the ANN and are produced by the output layer. As the understanding of the ANN of the input improves as the ANN is trained, the hidden representation is progressively differentiated from earlier iterations.

During a training process of an ANN, the node weights are adjusted to increase the accuracy of the result (e.g., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some aspects, image generation model 525 comprises one or more ANNs configured to generate an image based on the augmented text prompt, where the image depicts content of the input text prompt and has the level of the target characteristic. According to some aspects, image generation model 525 is configured to generate an image based on a training image that is labeled based on a target characteristic and a training prompt corresponding to the training image, where the training prompt includes training objective text indicating a level of the target characteristic.

According to some aspects, image generation model 525 is trained to generate an image based on the augmented text prompt and a set of target characteristics, where the image depicts content of the text prompt and has the level of the target characteristic.

In some cases, image generation model 525 comprises a diffusion model. According to some aspects, the diffusion model implements a reverse diffusion process (such as the reverse diffusion process described with reference to FIGS. 7 and 10). In some cases, image generation model 525 includes a U-Net (such as a U-Net described with reference to FIG. 8).

In some aspects, image generation model 525 is trained using annotated training data including a training image that is labeled based on the target characteristic and a training prompt corresponding to the training image. In some aspects, the training prompt includes training objective text at a same location as the objective text within the augmented text prompt. For example, in some cases, the text prompt is prepended with the objective text to obtain the augmented text prompt.

According to some aspects, classifier model 530 is implemented as software stored in memory unit 510 and executable by processor unit 505, as firmware, as one or more hardware circuits, or as a combination thereof. According to some aspects, classifier model 530 comprises classification parameters (e.g., machine learning parameters) stored in the one or more memory components.

According to some aspects, classifier model 530 comprises one or more ANNs trained to determine a level of a target characteristic of a training image. According to some aspects, classifier model 530 is trained to determine the level of the target characteristic based on the objective text. According to some aspects, classifier model 530 generates a training objective text based on a training image, where the training objective text indicates a level of a target characteristic depicted in the training image.

In some cases, classifier model 530 comprises a classifier. In some aspects, a classifier is a machine learning model that assigns input data to predefined categories or classes. In some cases, the classifier learns patterns and relationships from labeled training data and uses this knowledge to classify new, unseen data. Common classifier architectures include decision trees, support vector machines (SVMs), k-nearest neighbors (KNN), logistic regression, naive Bayes, and deep learning models such as convolutional neural networks (CNNs), recurrent neural networks (RNNs), and others.

A CNN is a class of ANN that is commonly used in computer vision or image classification systems. In some cases, a CNN may enable the processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During a training process, the filters may be modified so that the filters activate when the filters detect a particular feature within the input.

An RNN is a class of ANN in which connections between nodes form a directed graph along an ordered (e.g., a temporal) sequence. This enables an RNN to model temporally dynamic behavior such as predicting what element should come next in a sequence. Thus, an RNN is suitable for tasks that involve ordered sequences such as text recognition (where words are ordered in a sentence). In some cases, an RNN includes one or more finite impulse recurrent networks (characterized by nodes forming a directed acyclic graph), one or more infinite impulse recurrent networks (characterized by nodes forming a directed cyclic graph), or a combination thereof.

In some aspects, a value of the target characteristic includes an output of a classifier model 530. In some cases, classifier model 530 includes an aesthetic classifier trained to provide a value for an aesthetic level of an image. In some cases, classifier model 530 includes a counting classifier trained to determine a number of specified objects in an image. In some cases, classifier model 530 outputs training objective text.

According to some aspects, language generation model 535 is implemented as software stored in memory unit 510 and executable by processor unit 505, as firmware, as one or more hardware circuits, or as a combination thereof. According to some aspects, image generation model 525 comprises machine learning parameters stored in memory unit 510. In some cases, language generation model 535 is omitted from image generation apparatus 500. In some cases, language generation model 535 comprises one or more ANNs configured to generate the objective text based on an output of the classifier model 530. In some cases, language generation model 535 comprises one or more ANNs configured to generate the training objective text based on an output of the classifier model 530. For example, in some cases, language generation model 535 comprises a transformer.

In some cases, a transformer comprises one or more ANNs (such as a U-Net) comprising attention mechanisms that enable the transformer to weigh an importance of different words or tokens within a sequence. In some cases, a transformer processes entire sequences simultaneously in parallel, making the transformer highly efficient and allowing the transformer to capture long-range dependencies more effectively.

In some cases, a transformer comprises an encoder-decoder structure. In some cases, the encoder of the transformer processes an input sequence and encodes the input sequence into a set of high-dimensional representations. In some cases, the decoder of the transformer generates an output sequence based on the encoded representations and previously generated tokens. In some cases, the encoder and the decoder are composed of multiple layers of self-attention mechanisms and feed-forward ANNs.

In some cases, the self-attention mechanism allows the transformer to focus on different parts of an input sequence while computing representations for the input sequence. In some cases, the self-attention mechanism captures relationships between words of a sequence by assigning attention weights to each word based on a relevance to other words in the sequence, thereby enabling the transformer to model dependencies regardless of a distance between words.

An attention mechanism is a key component in some ANN architectures, particularly ANNs employed in natural language processing (NLP) and sequence-to-sequence tasks, which allows an ANN to focus on different parts of an input sequence when making predictions or generating output.

NLP refers to techniques for using computers to interpret or generate natural language. In some cases, NLP tasks involve assigning annotation data such as grammatical information to words or phrases within a natural language expression. Different classes of machine-learning algorithms have been applied to NLP tasks. Some algorithms, such as decision trees, utilize hard if-then rules. Other systems use neural networks or statistical models which make soft, probabilistic decisions based on attaching real-valued weights to input features. In some cases, these models express the relative probability of multiple answers.

Some sequence models (such as RNNs) process an input sequence sequentially, maintaining an internal hidden state that captures information from previous steps. However, in some cases, this sequential processing leads to difficulties in capturing long-range dependencies or attending to specific parts of the input sequence.

The attention mechanism addresses these difficulties by enabling an ANN to selectively focus on different parts of an input sequence, assigning varying degrees of importance or attention to each part. The attention mechanism achieves the selective focus by considering a relevance of each input element with respect to a current state of the ANN.

In some cases, an ANN employing an attention mechanism receives an input sequence and maintains the current state, which represents an understanding or context. For each element in the input sequence, the attention mechanism computes an attention score that indicates the importance or relevance of that element given the current state. The attention scores are transformed into attention weights through a normalization process, such as applying a softmax function. The attention weights represent the contribution of each input element to the overall attention. The attention weights are used to compute a weighted sum of the input elements, resulting in a context vector. The context vector represents the attended information or the part of the input sequence that the ANN considers most relevant for the current step. The context vector is combined with the current state of the ANN, providing additional information and influencing subsequent predictions or decisions of the ANN.

In some cases, by incorporating an attention mechanism, an ANN dynamically allocates attention to different parts of the input sequence, allowing the ANN to focus on relevant information and capture dependencies across longer distances.

In some cases, calculating attention involves three basic steps. First, a similarity between a query vector Q and a key vector K obtained from the input is computed to generate attention weights. In some cases, similarity functions used for this process include dot product, splice, detector, and the like. Next, a softmax function is used to normalize the attention weights. Finally, the attention weights are weighed together with their corresponding values V. In the context of an attention network, the key K and value V are vectors or matrices that are used to represent the input data. The key K is used to determine which parts of the input the attention mechanism should focus on, while the value V is used to represent the actual data being processed.

In some cases, language generation model 535 comprises a large language model (LLM). An LLM is a machine learning model that is designed and/or trained to learn statistical patterns and structures of human language. LLMs are capable of a wide range of language-related tasks such as text completion, question answering, translation, summarization, and creative writing, in response to a prompt. In some cases, the term "large" refers to a size and complexity of the LLM, for example, measured in terms of a number of parameters of the large language model, where more parameters allow an LLM to understand more intricate language patterns and generate more nuanced and coherent text.

Encoder 540 is an example of, or includes aspects of, the corresponding element described with reference to FIG. 6. In some cases, encoder 540 is an example of, or includes aspects of, an encoder described with reference to FIG. 7 or the text encoder described with reference to FIG. 20. According to some aspects, encoder 540 is implemented as software stored in memory unit 510 and executable by processor unit 505, as firmware, as one or more hardware circuits, or as a combination thereof. According to some aspects, classifier model 530 comprises encoding parameters (e.g., machine learning parameters) stored in the one or more memory components.

According to some aspects, encoder 540 comprises one or more ANNs trained to encode the augmented text prompt to obtain a text embedding, where image generation model 525 takes the text embedding as an input. According to some aspects, encoder 540 comprises one or more ANNs trained to encode an augmented training prompt to obtain a text embedding, where image generation model 525 takes the text embedding as input. In some cases, encoder 540 encodes the training prompt to obtain a text embedding. In some cases, encoder 540 comprises a transformer. In some cases, encoder 540 comprises an LLM. In some cases, encoder 540 is an example of, or includes aspects of, an encoder described with reference to FIG. 7.

According to some aspects, training component 545 is implemented as software stored in memory unit 510 and executable by processor unit 505, as firmware, as one or more hardware circuits, or as a combination thereof. According to some aspects, training component 550 is omitted from image generation apparatus 500 and is implemented in at least one apparatus separate from image generation apparatus 500 (for example, at least one apparatus comprised in a cloud, such as the cloud described with reference to FIG. 1). According to some aspects, the separate apparatus comprising training component 545 communicates with image generation apparatus 500 (for example, via the cloud) to perform the functions of training component 545 described herein.

According to some aspects, training component 545 obtains training data including a training image that is labeled based on a target characteristic and a training prompt corresponding to the training image, where the training prompt includes training objective text indicating a level of the target characteristic.

According to some aspects, training component 545 obtains training data including a training image, a text description of content of the training image, and a training objective text for the training image, where the training objective text indicates a level of a target characteristic for the training image. In some cases, the training objective text is output by classifier model 530 based on the training image. In some cases, training component 545 generates the augmented training prompt by adding the training prompt to the text description of the target image.

According to some aspects, training component 545 obtains a training image and a training description comprising text describing content of the training image. According to some aspects, training component 545 adds the training objective text to the training description to obtain a training prompt.

In some examples, training component 545 trains image generation model 525 to generate images having the level of the target characteristic based on the training data. In some aspects, the training is based on a diffusion process. In some aspects, the training data includes a set of different images corresponding to a set of levels of the target characteristic, respectively. According to some aspects, training component 545 trains image generation model 525 based on a comparison of the image and the training image. In some examples, training component 545 pretrains image generation model 525 based on unlabeled images.

According to some aspects, training component 545 is configured to train image generation model 525 using annotated training data including a training image that is labeled based on the target characteristic and a training prompt corresponding to the training image. In some aspects, the training prompt includes training objective text at a same location as the objective text within the augmented text prompt.

Figure 6:
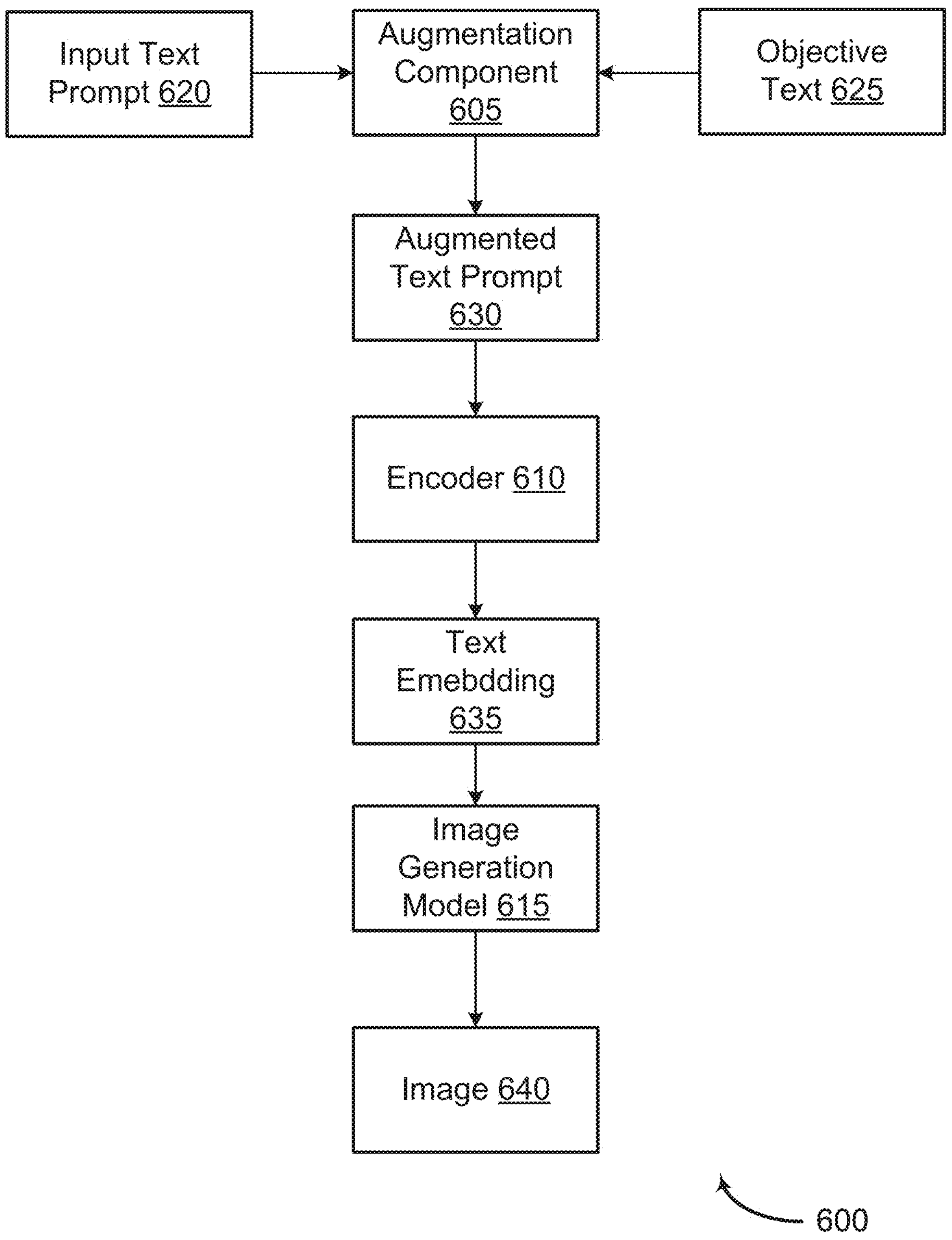
FIG. 6 shows an example of data flow in an image generation apparatus according to aspects of the present disclosure.

FIG. 6 shows an example of data flow in an image generation apparatus 600 according to aspects of the present disclosure. The example shown includes image generation apparatus 600, input text prompt 620, objective text 625, augmented text prompt 630, text embedding 635, and image 640. Input text prompt 620 is an example of, or includes aspects of, the corresponding element described with reference to FIG. 4. Augmented text prompt 630 is an example of, or includes aspects of, the corresponding element described with reference to FIGS. 4, 7, and 11-18. Text embedding 635 is an example of, or includes aspects of, the corresponding element described with reference to FIG. 7. Image 640 is an example of, or includes aspects of, the corresponding element described with reference to FIGS. 4, 7, and 10-18.

Image generation apparatus 600 is an example of, or includes aspects of, the corresponding element described with reference to FIGS. 1, 5, and 20. In one aspect, image generation apparatus 600 includes augmentation component 605, encoder 610, and image generation model 615. Augmentation component 605 is an example of, or includes aspects of, the corresponding element described with reference to FIG. 5. Encoder 610 is an example of, or includes aspects of, the corresponding element described with reference to FIG. 5. Image generation model 615 is an example of, or includes aspects of, the corresponding element described with reference to FIGS. 5 and 20.

Referring to FIG. 6, according to some aspects, augmentation component 605 combines input text prompt 620 and objective text 625 to generate augmented text prompt 630. In some cases, augmentation component 605 obtains augmented text prompt 630 as described with reference to FIG. 9. In some cases, encoder 610 encodes augmented text prompt 630 to generate text embedding 635. In some cases, encoder 610 obtains text embedding 635 as described with reference to FIG. 9. In some cases, image generation model 615 generates image 640 based on text embedding 635. In some cases, image generation model 615 generates image 640 as described with reference to FIGS. 9-11.

Figure 7:
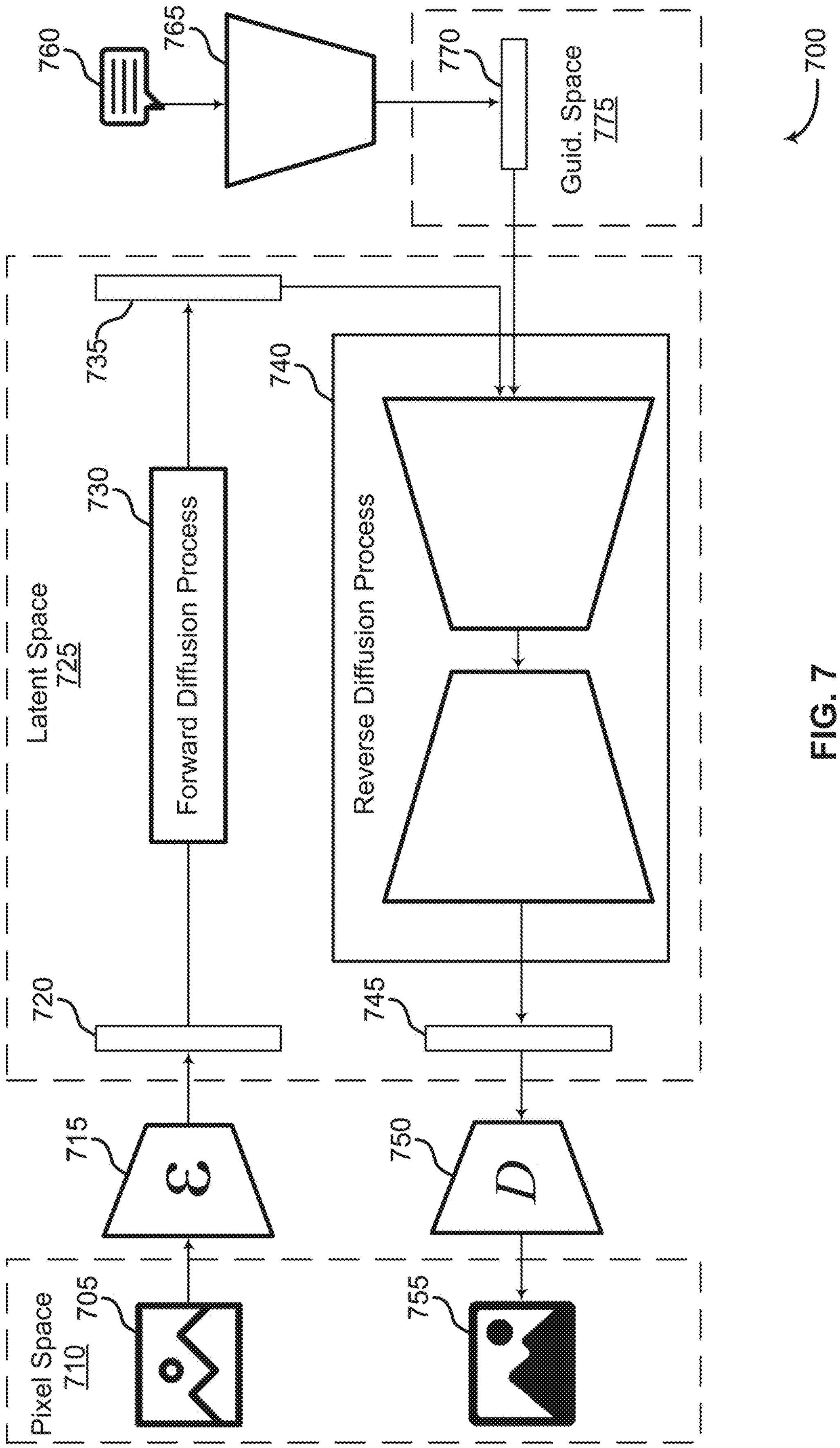
FIG. 7 shows an example of a guided diffusion architecture according to aspects of the present disclosure.

FIG. 7 shows an example of a guided diffusion architecture 700 according to aspects of the present disclosure. The example shown includes guided diffusion architecture 700, original image 705, pixel space 710, image encoder 715, original image feature 720, latent space 725, forward diffusion process 730, noisy feature 735, reverse diffusion process 740, denoised image features 745, image decoder 750, output image 755, prompt 760, encoder 765, guidance feature 770, and guidance space 775.

Diffusion models are a class of generative ANNs that can be trained to generate new data with features similar to features found in training data. In particular, diffusion models can be used to generate novel images. Diffusion models can be used for various image generation tasks, including image super-resolution, generation of images with perceptual metrics, conditional generation (e.g., generation based on text guidance), image inpainting, and image manipulation.

Diffusion models function by iteratively adding noise to data during a forward diffusion process and then learning to recover the data by denoising the data during a reverse diffusion process. Examples of diffusion models include Denoising Diffusion Probabilistic Models (DDPMs) and Denoising Diffusion Implicit Models (DDIMs). In DDPMs, a generative process includes reversing a stochastic Markov diffusion process. On the other hand, DDIMs use a deterministic process so that a same input results in a same output. Diffusion models may also be characterized by whether noise is added to an image itself, or to image features generated by an encoder, as in latent diffusion.

For example, according to some aspects, image encoder 715 (such as the image encoder described with reference to FIG. 20) encodes original image 705 from pixel space 710 and generates original image features 720 in latent space 725. In some cases, original image 705 is an example of, or includes aspects of, a training image described with reference to FIG. 20. In some cases, image encoder 715 is a synonymous encoder for encoder 765. In some cases, image encoder 715 covers an image structure and semantic concepts of original image 705.

According to some aspects, forward diffusion process 730 gradually adds noise to original image features 720 to obtain noisy features 735 (also in latent space 725) at various noise levels. In some cases, original image features 720 are an example of, or include aspects of, the image embedding described with reference to FIG. 20. In some cases, forward diffusion process 730 is implemented as the forward diffusion process described with reference to FIG. 10 or 21. In some cases, forward diffusion process 730 is implemented by an image generation apparatus (such as the image generation apparatus described with reference to FIG. 5) or by a training component (such as the training component described with reference to FIG. 5).

According to some aspects, reverse diffusion process 740 is applied to noisy features 735 to gradually remove the noise from noisy features 735 at the various noise levels to obtain denoised image features 745 in latent space 725. In some cases, reverse diffusion process 740 is implemented as the reverse diffusion process described with reference to FIG. 10 or 21. In some cases, reverse diffusion process 740 is implemented by an image generation model (such as the image generation model described with reference to FIGS. 5-6 and 20). In some cases, reverse diffusion process 740 is implemented by a U-Net ANN described with reference to FIG. 8 included in the image generation model.

According to some aspects, a training component (such as the training component described with reference to FIG. 5) compares denoised image features 745 to original image features 720 at each of the various noise levels, and updates image generation parameters of the image generation model based on the comparison. In some cases, image decoder 750 decodes denoised image features 745 to obtain output image 755 in pixel space 710. In some cases, an output image 755 is created at each of the various noise levels. In some cases, the training component compares output image 755 to original image 705 to train the diffusion model.

In some cases, image encoder 715 and image decoder 750 are pretrained prior to training the image generation model. In some examples, image encoder 715, image decoder 750, and the image generation model are jointly trained. In some cases, image encoder 715 and image decoder 750 are jointly fine-tuned with the image generation model.

According to some aspects, reverse diffusion process 740 is guided based on a guidance prompt such as prompt 760 (e.g., an augmented text prompt or an augmented training prompt as described herein). In some cases, prompt 760 is encoded using encoder 765 (e.g., an encoder as described with reference to FIG. 5) to obtain guidance features 770 (e.g., a text embedding as described herein) in guidance space 775. In some cases, guidance features 770 are combined with noisy features 735 at one or more layers of reverse diffusion process 740 to encourage output image 755 to include content described by prompt 760 at a level of a target characteristic described by prompt 760. For example, guidance features 770 can be combined with noisy features 735 using a cross-attention block within reverse diffusion process 740.

Cross-attention, also known as multi-head attention, is an extension of the attention mechanism used in some ANNs for NLP tasks. In some cases, cross-attention enables reverse diffusion process 740 to attend to multiple parts of an input sequence simultaneously, capturing interactions and dependencies between different elements. In cross-attention, there are two input sequences: a query sequence and a key-value sequence. The query sequence represents the elements that require attention, while the key-value sequence contains the elements to attend to. In some cases, to compute cross-attention, the cross-attention block transforms (for example, using linear projection) each element in the query sequence into a "query" representation, while the elements in the key-value sequence are transformed into "key" and "value" representations.

The cross-attention block calculates attention scores by measuring a similarity between each query representation and the key representations, where a higher similarity indicates that more attention is given to a key element. An attention score indicates an importance or relevance of each key element to a corresponding query element.

The cross-attention block then normalizes the attention scores to obtain attention weights (for example, using a softmax function), where the attention weights determine how much information from each value element is incorporated into the final attended representation. By attending to different parts of the key-value sequence simultaneously, the cross-attention block captures relationships and dependencies across the input sequences (such as a relative position of an objective text and a text prompt within prompt 760), allowing reverse diffusion process 740 to understand the context and generate more accurate and contextually relevant outputs.

According to some aspects, image encoder 715 and image decoder 750 are omitted, and forward diffusion process 730 and reverse diffusion process 740 occur in pixel space 710. For example, in some cases, forward diffusion process 730 adds noise to original image 705 to obtain noisy images in pixel space 710, and reverse diffusion process 740 gradually removes noise from the noisy images to obtain output image 755 in pixel space 710.

Figure 8:
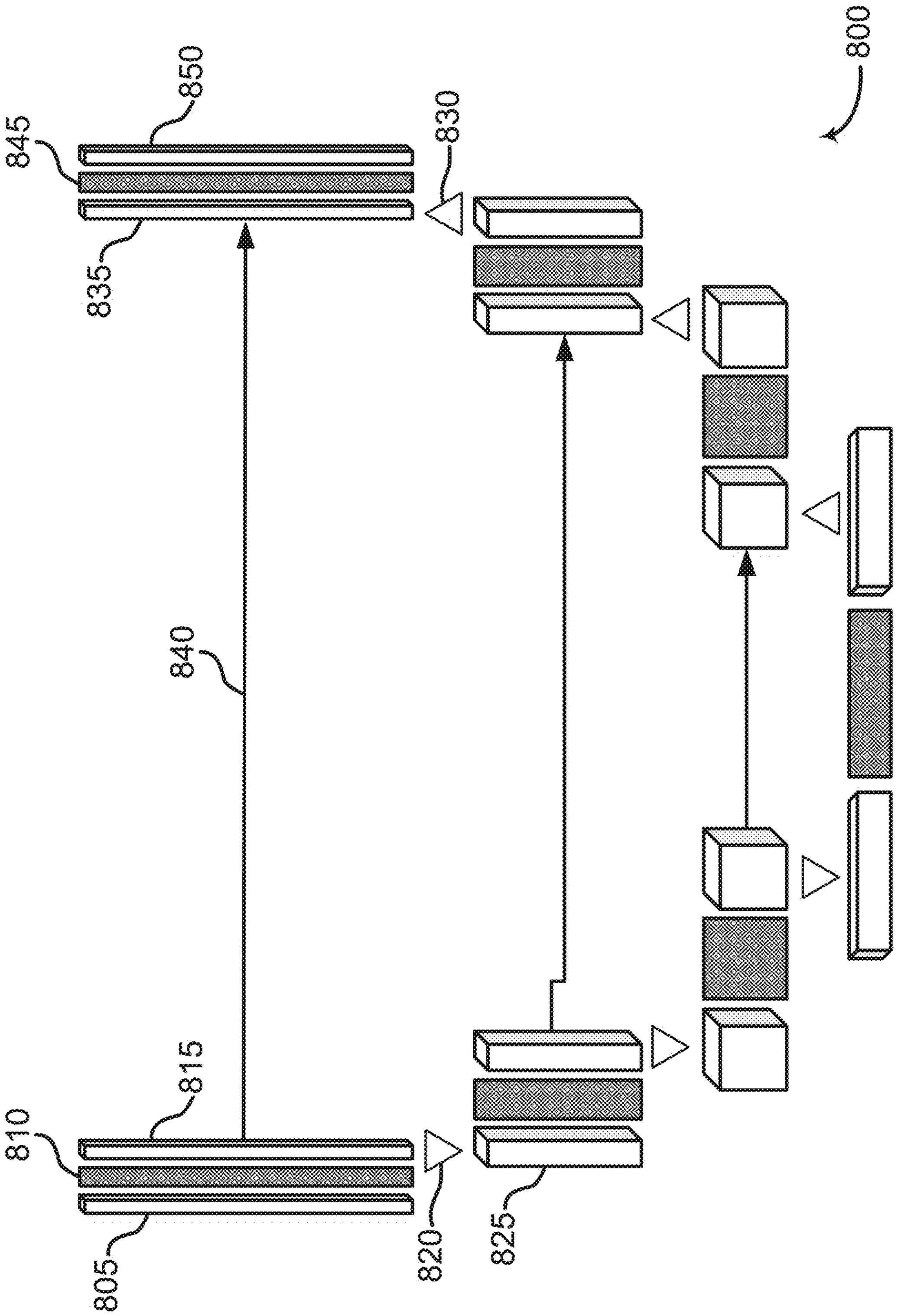
FIG. 8 shows an example of a U-Net according to aspects of the present disclosure.

FIG. 8 shows an example of a U-Net 800 according to aspects of the present disclosure. The example shown includes U-Net 800, input features 805, initial neural network layer 810, intermediate features 815, down-sampling layer 820, down-sampled features 825, up-sampling process 830, up-sampled features 835, skip connection 840, final neural network layer 845, and output features 850.

According to some aspects, an image generation model (such as the image generation model described with reference to FIGS. 5-6 and 20) comprises an ANN architecture known as a U-Net. In some cases, U-Net 800 implements the reverse diffusion process described with reference to FIG. 7, 10, or 21.

According to some aspects, U-Net 800 receives input features 805, where input features 805 include an initial resolution and an initial number of channels, and processes input features 805 using an initial neural network layer 810 (e.g., a convolutional neural network layer) to produce intermediate features 815.

In some cases, intermediate features 815 are then down-sampled using a down-sampling layer 820 such that down-sampled features 825 have a resolution less than the initial resolution and a number of channels greater than the initial number of channels.

In some cases, this process is repeated multiple times, and then the process is reversed. For example, down-sampled features 825 are up-sampled using up-sampling process 830 (or an up-sampling layer) to obtain up-sampled features 835. In some cases, up-sampled features 835 are combined with intermediate features 815 having a same resolution and number of channels via skip connection 840. In some cases, the combination of intermediate features 815 and up-sampled features 835 are processed using final neural network layer 845 to produce output features 850. In some cases, output features 850 have the same resolution as the initial resolution and the same number of channels as the initial number of channels.

According to some aspects, U-Net 800 receives additional input features to produce a conditionally generated output. In some cases, the additional input features include a vector representation of an input prompt. In some cases, the additional input features are combined with intermediate features 815 within U-Net 800 at one or more layers. For example, in some cases, a cross-attention module is used to combine the additional input features and intermediate features 815.

Image Generation

A method for image generation using machine learning is described with reference to FIGS. 9-18. One or more aspects of the method include obtaining a text prompt and an indication of a level of a target characteristic, wherein the target characteristic comprises a characteristic used to train an image generation model. One or more aspects of the method further include generating an augmented text prompt including the input text prompt and an objective text corresponding to the indication of the level of the target characteristic. One or more aspects of the method further include generating, using the image generation model, an image based on the augmented text prompt, where the image depicts content of the input text prompt and has the level of the target characteristic.

Some examples of the method further include determining the level of the target characteristic based on the objective text using a classifier model. In some examples, generating the augmented text prompt comprises prepending the objective text to the input text prompt. In some aspects, the objective text indicates a level of image quality. In some aspects, the objective text indicates a number of objects described by the input text prompt.

In some aspects, the image generation model is trained using annotated training data including a training image that is labeled based on the target characteristic and a training prompt corresponding to the training image. In some aspects, the training prompt includes training objective text at a same location as the objective text within the augmented text prompt.

Some examples of the method further include encoding the augmented text prompt to obtain a text embedding. In some examples, the image generation model takes the text embedding as an input.

Figure 9:
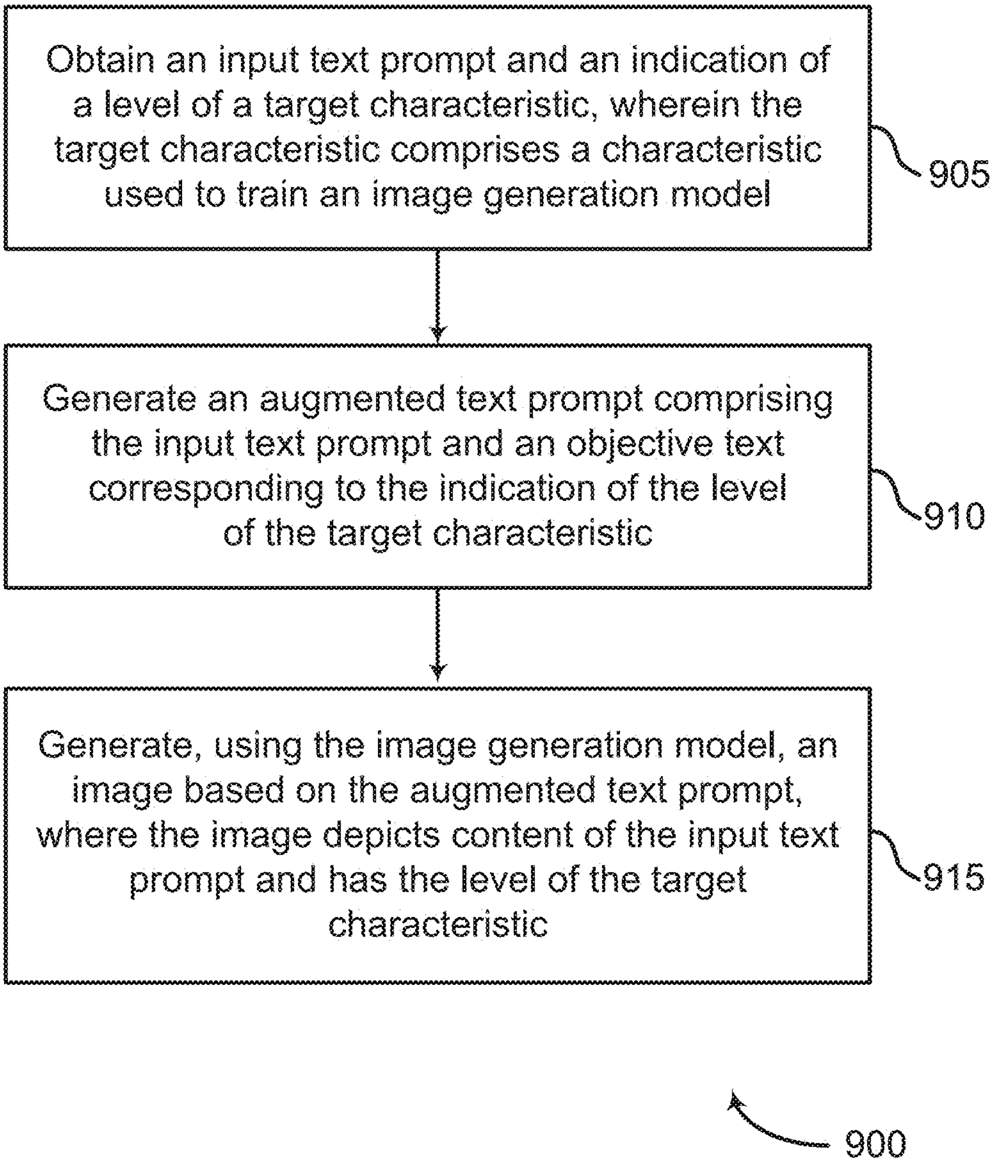
FIG. 9 shows an example of a method for image generation according to aspects of the present disclosure.

FIG. 9 shows an example of a method 900 for image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 9, according to some aspects, an objective text (e.g., a reward) corresponding to a level of a target characteristic is provided as part of a text conditioning for an image generation model, such that the image generation model generates an image reflecting the level of the target characteristic. Therefore, in some cases, because a reward is used as part of an input condition for the image generation model, the image generation system is flexible and does not rely upon a model-provided score, unlike other conventional image generation systems that employ expensive, time-consuming, and unreliable reinforcement learning mechanisms. Furthermore, in some cases, a user-provided label can be used directly as a reward. Additionally, by conditioning the image generation model on the objective text, a visual characteristic of the image can be controlled by the user in a more direct manner than conventional image generation systems, which rely on a trial-and-error approach to generating images having specific visual characteristics.

At operation 905, the system obtains an input text prompt and an indication of a level of a target characteristic, where the target characteristic includes a characteristic used to train an image generation model. In some cases, the operations of this step refer to, or may be performed by, a user interface as described with reference to FIG. 5. For example, in some cases, a user (such as the user described with reference to FIG. 1) provides the input text prompt to the user interface via the user interface, where the user interface is provided by an image generation apparatus (such as the image generation apparatus described with reference to FIGS. 1 and 5) on a user device (such as the user device described with reference to FIG. 1). In some cases, the input text prompt includes text describing content of an image to be generated by the image generation apparatus.

In some cases, the user provides the indication of the level of the target characteristic to an element (such as a slider) of the user interface. In some cases, the user selects the target characteristic from a list of target characteristics (for example, via another element of the user interface, such as a drop-down menu). In some cases, the set of target characteristics and/or the list of target characteristics is stored in a database (such as the database described with reference to FIG. 1). In some cases, the image generation model is trained as described with reference to FIGS. 19-21.

At operation 910, the system generates an augmented text prompt including the input text prompt and an objective text corresponding to the indication of the level of the target characteristic. In some cases, the operations of this step refer to, or may be performed by, an augmentation component as described with reference to FIGS. 5 and 6. For example, in some cases, the augmentation component receives the input text prompt and the indication of the level of the target characteristic from the user interface. In some cases, the augmentation component obtains the objective text by generating text including text corresponding to the target characteristic (e.g., text "aesthetic" for a target aesthetic characteristic) and text corresponding to the level of the target characteristic (e.g., text "6.5" for a 6.5 level). In some cases, the augmentation component generates the augmented text prompt by adding the objective text to the input text prompt. In some cases, the augmentation component generates the augmented text prompt by prepending the objective text to the input text prompt. In some cases, the augmented text prompt includes a character (such as a semicolon) separating the objective text and the input text prompt.

In some cases, the level of the target characteristic comprises an output of a classifier model (such as the classifier model described with reference to FIG. 5). In some cases, the classifier model determines the level of the target characteristic based on the objective text. In some cases, the objective text indicates a level of image quality. In some cases, the objective text indicates a number of objects described by the input text prompt.

In some cases, an encoder encodes the augmented text prompt to obtain a text embedding. For example, in some cases, the encoder generates a representation of the augmented text prompt. In some cases, the representation is a vector representation.

At operation 915, the system generates, using the image generation model, an image based on the augmented text prompt, where the image depicts content of the input text prompt and has the level of the target characteristic. In some cases, the operations of this step refer to, or may be performed by, an image generation model as described with reference to FIGS. 5, 6, 11, and 20.

In some cases, the image generation apparatus obtains noisy images or noisy image features using a forward diffusion process as described with reference to FIGS. 7 and 10. In some cases, the image generation model generates the image by removing noise from the noisy images or noisy image features using a reverse diffusion process as described with reference to FIGS. 7 and 10-11. In some cases, the image generation model takes the text embedding as an input (for example, as a guidance embedding).

In some cases, the image depicts content described by the input text prompt. For example, for an input text prompt "astronaut riding a camel", the image depicts an astronaut riding a camel. In some cases, the image has the level of the target characteristic. For example, for an objective text "aesthetic 6.5", the image has a relatively high aesthetic characteristic, according to the image generation model's training of what an image having a relatively high aesthetic characteristic looks like. Examples of images generated based on augmented text prompts are described with reference to FIGS. 11-18.

In some cases, the image generation model is trained using annotated training data including a training image that is labeled based on the target characteristic and a training prompt corresponding to the training image. In some cases, the training prompt includes training objective text at a same location as the objective text within the augmented text prompt. For example, in some cases, the training prompt includes the text prompt prepended to the objective text.

Figure 10:
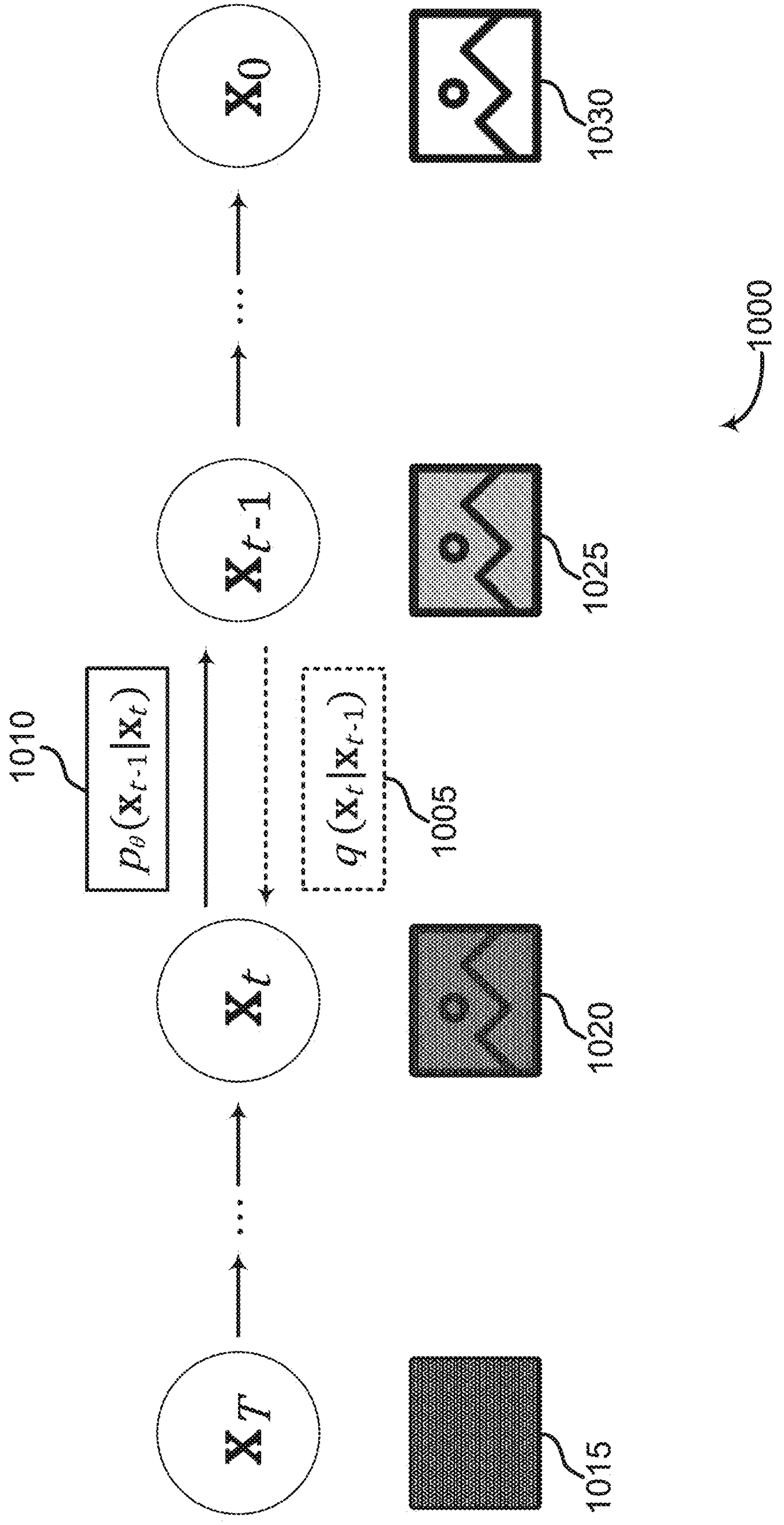
FIG. 10 shows an example of diffusion processes according to aspects of the present disclosure.

FIG. 10 shows an example 1000 of diffusion processes according to aspects of the present disclosure. The example shown includes forward diffusion process 1005 (such as the forward diffusion process described with reference to FIG. 7) and reverse diffusion process 1010 (such as the reverse diffusion process described with reference to FIG. 7). In some cases, forward diffusion process 1005 adds noise to an image (e.g., original image 1030 in a pixel space or image features in a latent space) to obtain a noisy image 1015. In some cases, reverse diffusion process 1010 denoises the noisy image 1015 (or image features in the latent space) to obtain a denoised image.

According to some aspects, an image generation apparatus (such as the image generation apparatus described with reference to FIGS. 1 and 5) uses forward diffusion process 1005 to iteratively add Gaussian noise to an input at each diffusion step t according to a known variance schedule $0<\beta_1<\beta_2< \ldots <\beta_T<1$:

$$q(x_t|x_{t-1}) = \mathcal{N}(x_t; \sqrt{1-\beta_t}\,x_{t-1}, \beta_t I) \tag{1}$$

According to some aspects, the Gaussian noise is drawn from a Gaussian distribution with mean $\mu_t=\sqrt{1-\beta_t}x_{t-1}$ and variance $\sigma^2=\beta_t\geq 1$ by sampling $\epsilon\sim\mathcal{N}(0, I)$ and setting $x_t=\sqrt{1-\beta_t}x_{t-1}+\sqrt{\beta_t}\epsilon$. Accordingly, beginning with an initial input $x_0$, forward diffusion process 1005 produces $x_1, \ldots, x_t, \ldots x_T$, where $x_T$ is pure Gaussian noise.

In some cases, an observed variable $x_0$ (such as original image 1030) is mapped in either a pixel space or a latent space to intermediate variables $x_1, \ldots, x_T$ using a Markov chain, where the intermediate variables $x_1, \ldots x_T$ have a same dimensionality as the observed variable $x_0$. In some cases, the Markov chain gradually adds Gaussian noise to the observed variable $x_0$ or to the intermediate variables $x_1, \ldots, x_T$, respectively, to obtain an approximate posterior $q(x_{1:T}|x_0)$.

According to some aspects, during reverse diffusion process 1010, a diffusion model (such as the image generation model described with reference to FIGS. 5-6 and 20) gradually removes noise from $x_T$ to obtain a prediction of the observed variable $x_0$ (e.g., a representation of what the diffusion model predicts the original image 1030 should be). In some cases, the prediction is influenced by a guidance prompt or a guidance vector (for example, a prompt or a prompt embedding described with reference to FIG. 7). A conditional distribution $p(x_{t-1}|x_t)$ of the observed variable $x_0$ is unknown to the diffusion model, however, as calculating the conditional distribution would require a knowledge of a distribution of all possible images. Accordingly, the diffusion model is trained to approximate (e.g., learn) a conditional probability distribution $p_\theta(x_{t-1}|x_t)$ of the conditional distribution $p(x_{t-1}|x_t)$:

$$p_\theta(x_{t-1}|x_t) = \mathcal{N}(x_{t-1}; \mu_\theta(x_t, t), \Sigma_\theta(x_t, t)) \tag{2}$$

In some cases, a mean of the conditional probability distribution $p_\theta(x_{t-1}|x_t)$ is parameterized by $\mu_\theta$ and a variance of the conditional probability distribution $p_\theta(x_{t-1}|x_t)$ is parameterized by $\Sigma_\theta$. In some cases, the mean and the variance are conditioned on a noise level t (e.g., an amount of noise corresponding to a diffusion step t). According to some aspects, the diffusion model is trained to learn the mean and/or the variance.

According to some aspects, the diffusion model initiates reverse diffusion process 1010 with noisy data $x_T$ (such as noisy image 1015). According to some aspects, the diffusion model iteratively denoises the noisy data $x_T$ to obtain the conditional probability distribution $p_\theta(x_{t-1}|x_t)$. For example, in some cases, at each step t−1 of reverse diffusion process 1010, the diffusion model takes $x_t$ (such as first intermediate image 1020) and t as input, where t represents a step in a sequence of transitions associated with different noise levels, and iteratively outputs a prediction of $x_{t-1}$ (such as second intermediate image 1025) until the noisy data $x_T$ is reverted to a prediction of the observed variable $x_0$ (e.g., a predicted image for original image 1030).

According to some aspects, a joint probability of a sequence of samples in the Markov chain is determined as a product of conditionals and a marginal probability:

$$x_T : p_\theta(x_{0:T}) := p(x_T)\prod_{t=1}^{T} p_\theta(x_{t-1} \mid x_T) \tag{3}$$

In some cases, $p(x_T)=\mathcal{N}(x_T; 0, I)$ is a pure noise distribution, as reverse diffusion process 1010 takes an outcome of forward diffusion process 1005 (e.g., a sample of pure noise $x_T$) as input, and $$\prod_{t=1}^{T} p_\theta(x_{t-1} \mid x_t)$$

represents a sequence of Gaussian transitions corresponding to a sequence of addition of Gaussian noise to a sample.

Figure 11:
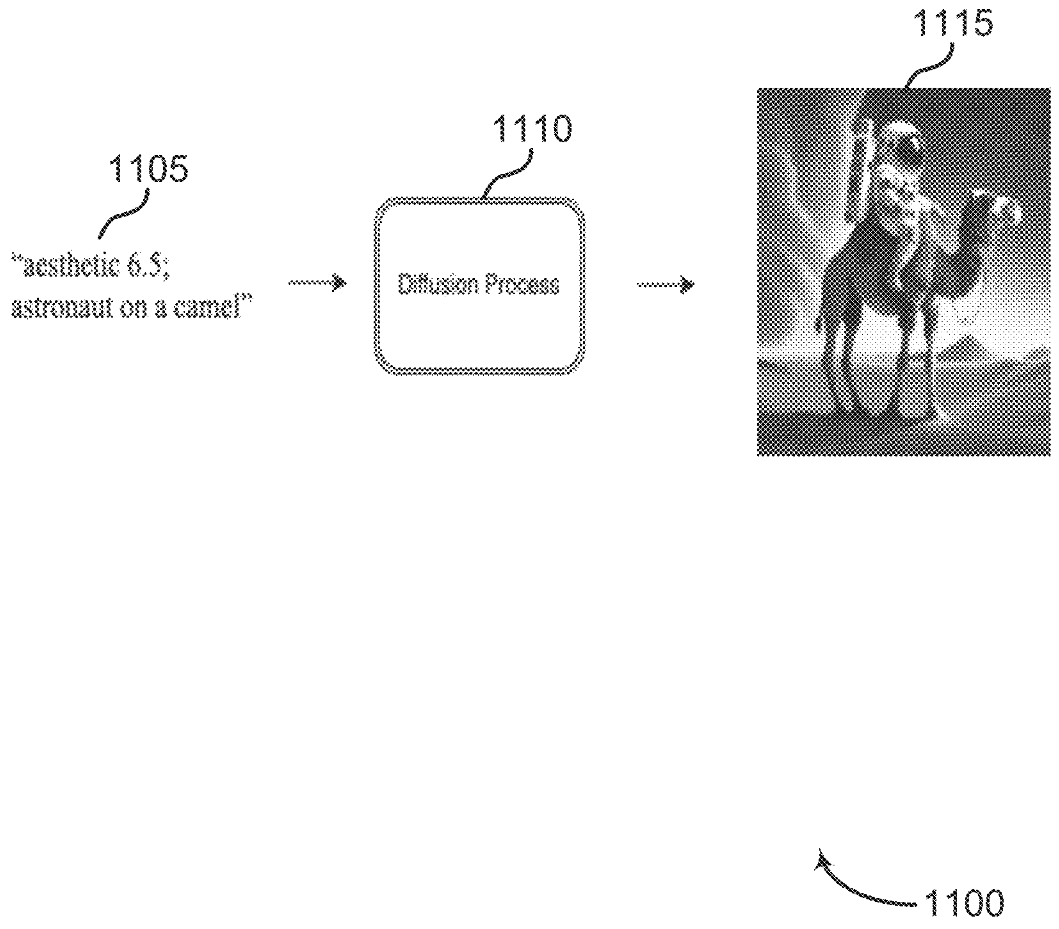
FIG. 11 shows an example of generating an image using an image generation model according to aspects of the present disclosure.

FIG. 11 shows an example 1100 of generating an image using an image generation model according to aspects of the present disclosure. The example shown includes augmented text prompt 1105, diffusion process 1110, and image 1115. Augmented text prompt 1105 is an example of, or includes aspects of, the corresponding elements described with reference to FIGS. 4, 6-7, and 12-18. Diffusion process 1110 is an example of, or includes aspects of, a reverse diffusion process described with reference to FIGS. 7 and 10. Image 1115 is an example of, or includes aspects of, the corresponding element described with reference to FIGS. 4, 6-7, 10, and 12-18.

Referring to FIG. 11, diffusion process 1110 receives a text embedding of augmented text prompt 1105 as input and generates image 1115 based on augmented text prompt 1105. As shown in FIG. 11, augmented text prompt 1105 includes an objective text "aesthetic 6.5" prepended to input text prompt "astronaut on a camel", and image 1115 depicts an astronaut on a camel at a high aesthetic level. In some cases, variants of image 1115 depicting an astronaut on a camel at a high aesthetic level are generated based on augmented text prompt 1105.

FIG. 12 shows a second example 1200 of images generated based on an augmented text prompt according to aspects of the present disclosure. The example shown includes input text prompt 1205, first set of images 1210, first augmented text prompt 1215, second set of images 1220, second augmented text prompt 1225, third set of images 1230, third augmented text prompt 1235, fourth set of images 1240, fourth augmented text prompt 1245, fifth set of images 1250, fifth augmented text prompt 1255, sixth set of images 1260, sixth augmented text prompt 1265, and seventh set of images 1270.

As shown in FIG. 12, input text prompt 1205 includes "full leafed oak tree of life in spring with exposed roots floating over an empty space", and each of the augmented text prompts includes input text prompt 1205 (shown in abbreviated form for ease of illustration) and an objective text corresponding to a level of an aesthetic characteristic. The augmented text prompts are arranged according to an increasing aesthetic level (e.g., from 2.0 to 6.5). The sets of images are respectively generated based on the input text prompt or the augmented text prompts. In some cases, for example, seventh set of images 1270 is generated based on sixth augmented text prompt 1265 including an objective text corresponding to a 6.5 level of an aesthetic characteristic, and therefore includes images that have a higher aesthetic level than second set of images 1220, which are generated based on first augmented text prompt 1215 including objective text corresponding to a 2.0 level of an aesthetic characteristic. For example, seventh set of images 1270 may have enhanced image composition, more detail, enhanced color combination, higher contrast, and defined texture over second set of images 1220.

FIG. 13 shows a third example 1300 of images generated based on an augmented text prompt according to aspects of the present disclosure. The example shown includes input text prompt 1305, first set of images 1310, first augmented text prompt 1315, second set of images 1320, second augmented text prompt 1325, third set of images 1330, third augmented text prompt 1335, fourth set of images 1340, fourth augmented text prompt 1345, fifth set of images 1350, fifth augmented text prompt 1355, sixth set of images 1360, sixth augmented text prompt 1365, and seventh set of images 1370.

As shown in FIG. 13, input text prompt 1305 includes "interior design living room with lots of plants, blank frame", and each of the augmented text prompts includes input text prompt 1305 (shown in abbreviated form for ease of illustration) and an objective text corresponding to a level of an aesthetic characteristic. The augmented text prompts are arranged according to an increasing aesthetic level (e.g., from 2.0 to 6.5). The sets of images are respectively generated based on the input text prompt or the augmented text prompts. In some cases, for example, sixth set of images 1360 is generated based on fifth augmented text prompt 1355 including an objective text corresponding to a 6.0 level of an aesthetic characteristic, and therefore includes images that have a higher aesthetic level than third set of images 1330, which are generated based on second augmented text prompt 1325 including objective text corresponding to a 3.0 level of an aesthetic characteristic.

FIG. 14 shows a fourth example 1400 of images generated based on an augmented text prompt according to aspects of the present disclosure. The example shown includes first augmented text prompt 1405, first set of images 1410, second augmented text prompt 1415, second set of images 1420, third augmented text prompt 1425, and third set of images 1430.

For example, first augmented text prompt 1405 includes "aesthetic 1; a yellow colored banana." First augmented text prompt 1405 includes objective text corresponding to a level (e.g., 1) of a target characteristic (e.g., aesthetic) prepending an input text prompt (e.g., "a yellow colored banana"). The augmented text prompts are arranged in an increasing aesthetic level (e.g., from 1 to 5). The sets of images are respectively generated based on the corresponding augmented text prompts, and the sets of images include content described by the input text prompt and have levels of the target aesthetic characteristic.

FIG. 15 shows a fifth example 1500 of images generated based on an augmented text prompt according to aspects of the present disclosure. The example shown includes first augmented text prompt 1505, first set of images 1510, second augmented text prompt 1515, second set of images 1520, third augmented text prompt 1525, and third set of images 1530.

For example, first augmented text prompt 1505 includes "aesthetic 1; three cars on the street." First augmented text prompt 1505 includes objective text corresponding to a level (e.g., 1) of a target characteristic (e.g., aesthetic) prepending an input text prompt (e.g., "a three cars on the street"). The augmented text prompts are arranged in an increasing aesthetic level (e.g., from 1 to 5). The sets of images are respectively generated based on the corresponding augmented text prompts, and the sets of images include content described by the input text prompt and have levels of the target aesthetic characteristic.

FIG. 16 shows a sixth example 1600 of images generated based on an augmented text prompt according to aspects of the present disclosure. The example shown includes first augmented text prompt 1605, first set of images 1610, second augmented text prompt 1615, second set of images 1620, third augmented text prompt 1625, and third set of images 1630.

For example, first augmented text prompt 1605 includes "aesthetic 1; a large plane flying in the air." First augmented text prompt 1605 includes objective text corresponding to a level (e.g., 1) of a target characteristic (e.g., aesthetic) prepending an input text prompt (e.g., "a large plane flying in the air"). The augmented text prompts are arranged in an increasing aesthetic level (e.g., from 1 to 5). The sets of images are respectively generated based on the corresponding augmented text prompts, and the sets of images include content described by the input text prompt and have levels of the target aesthetic characteristic.

FIG. 17 shows a seventh example 1700 of images generated based on an augmented text prompt according to aspects of the present disclosure. The example shown includes first augmented text prompt 1705, first set of images 1710, second augmented text prompt 1715, and second set of images 1720.

For example, first augmented text prompt 1705 includes "aesthetic 0; large motor vehicle carrying passengers by road, typically one serving the public on a fixed route and for a fare." First augmented text prompt 1705 includes objective text corresponding to a level (e.g., 0) of a target characteristic (e.g., aesthetic) prepending an input text prompt (e.g., "large motor vehicle carrying passengers by road, typically one serving the public on a fixed route and for a fare"). The augmented text prompts are arranged in an increasing aesthetic level (e.g., from 0 to 1). The sets of images are respectively generated based on the corresponding augmented text prompts, and the sets of images include content described by the input text prompt and have levels of the target aesthetic characteristic.

FIG. 18 shows an eighth example 1800 of images generated based on an augmented text prompt according to aspects of the present disclosure. The example shown includes first augmented text prompt 1805, first set of images 1810, second augmented text prompt 1815, and second set of images 1820.

For example, first augmented text prompt 1805 includes "aesthetic 0; a couple of glasses are sitting on a table." First augmented text prompt 1805 includes objective text corresponding to a level (e.g., 0) of a target characteristic (e.g., aesthetic) prepending an input text prompt (e.g., "a couple of glasses are sitting on a table"). The augmented text prompts are arranged in an increasing aesthetic level (e.g., from 0 to 1). The sets of images are respectively generated based on the corresponding augmented text prompts, and the sets of images include content described by the input text prompt and have levels of the target aesthetic characteristic.

Training

A method for image generation using machine learning is described with reference to FIGS. 19-21. One or more aspects of the method include obtaining training data including a training image that is labeled based on a target characteristic and a training prompt corresponding to the training image, where the training prompt includes training objective text indicating a level of the target characteristic. One or more aspects of the method further include training an image generation model to generate images having the level of the target characteristic based on the training data.

Some examples of the method further include applying a classifier model to the training image to determine the level of the target characteristic. Some examples further include generating the objective text based on an output of the classifier model. In some aspects, the classifier model comprises an aesthetic classifier.

In some aspects, the training is based on a diffusion process. In some aspects, the training data comprises a plurality of different images corresponding to a plurality of levels of the target characteristic, respectively. Some examples of the method further include pretraining the image generation model based on unlabeled images.

A method for image generation using machine learning is described with reference to FIGS. 19-21. One or more aspects of the method include obtaining a training image and a training description comprising text describing content of the training image. One or more aspects of the method further include generating, using a classifier model, a training objective text based on the training image, where the training objective text indicates a level of a target characteristic depicted in the training image. One or more aspects of the method further include adding the training objective text to the training description to obtain a training prompt. One or more aspects of the method further include encoding, using an encoder, the training prompt to obtain a text embedding. One or more aspects of the method further include generating, using an image generation model, an image based on the text embedding. One or more aspects of the method further include training the image generation model based on a comparison of the image and the training image.

Figure 19:
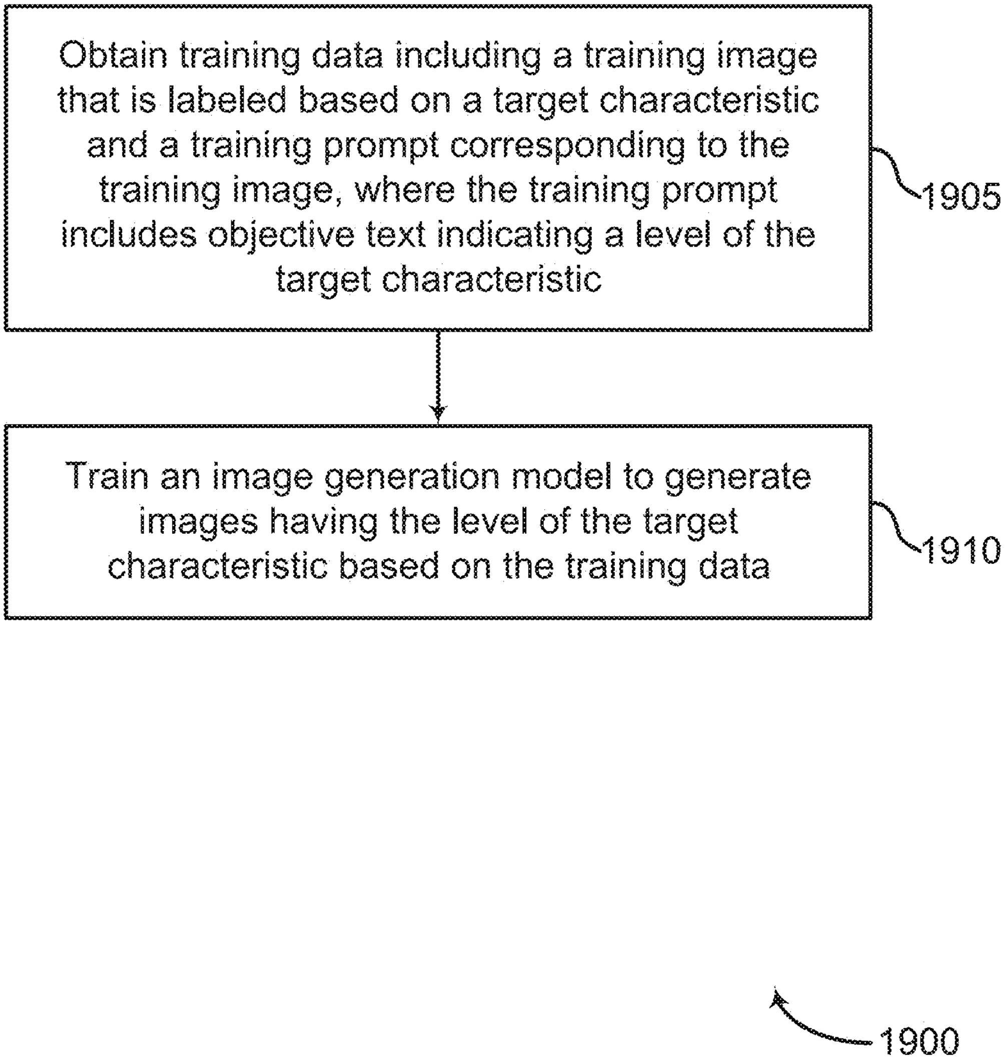
FIG. 19 shows an example of a method for training an image generation model according to aspects of the present disclosure.

FIG. 19 shows an example of a method 1900 for training an image generation model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 19, according to some aspects, a training objective text describing a level of a target characteristic included in a training image is obtained. In some cases, the training objective text is obtained manually. In some cases, a classifier model (such as the classifier model described with reference to FIG. 5) generates the training objective text based on the training image. According to some aspects, the training objective text is added to a text description of the training image to obtain a training prompt. In some cases, an image generation model is trained based on the training prompt.

In some cases, aspects of the present disclosure therefore train the image generation model based on feedback (e.g., the objective text) faster than conventional methods using reinforcement learning (RL) because a reward (e.g., the objective text) does not need to be computed at runtime and reward computing can therefore be scaled up offline. In some cases, a process for training an image generation model according to the present disclosure uses less resources as compared to other RL mechanisms for training an image generation model as the process does not require storing a value model, a reference image generation model, and/or a reward model in memory simultaneously. In some cases, by avoiding RL for training the image generation model, aspects of the present disclosure avoid training instability due to hyperparameters of the image generation model, in contrast to conventional RL techniques.

At operation 1905, the system obtains training data including a training image that is labeled based on a target characteristic and a training prompt corresponding to the training image, where the training prompt includes training objective text indicating a level of the target characteristic. In some cases, the operations of this step refer to, or may be performed by, a training component as described with reference to FIG. 5. In some cases, the training component retrieves the training data from a database (such as the database described with reference to FIG. 1). In some cases, obtaining the training data can include creating training samples for training the image generation model. In some cases, the target characteristic is included in a set of one or more target characteristics that the image generation model is to be trained on.

At operation 1910, the system trains an image generation model to generate images having the level of the target characteristic based on the training data. In some cases, the operations of this step refer to, or may be performed by, a training component as described with reference to FIG. 5. In some cases, the training component trains the image generation model as described with reference to FIGS. 20 and 21. In some examples, the training component pretrains the image generation model (e.g., image generation model 525 described with reference to FIG. 5) using a process described with reference to FIG. 21 based on unlabeled images.

Figure 20:
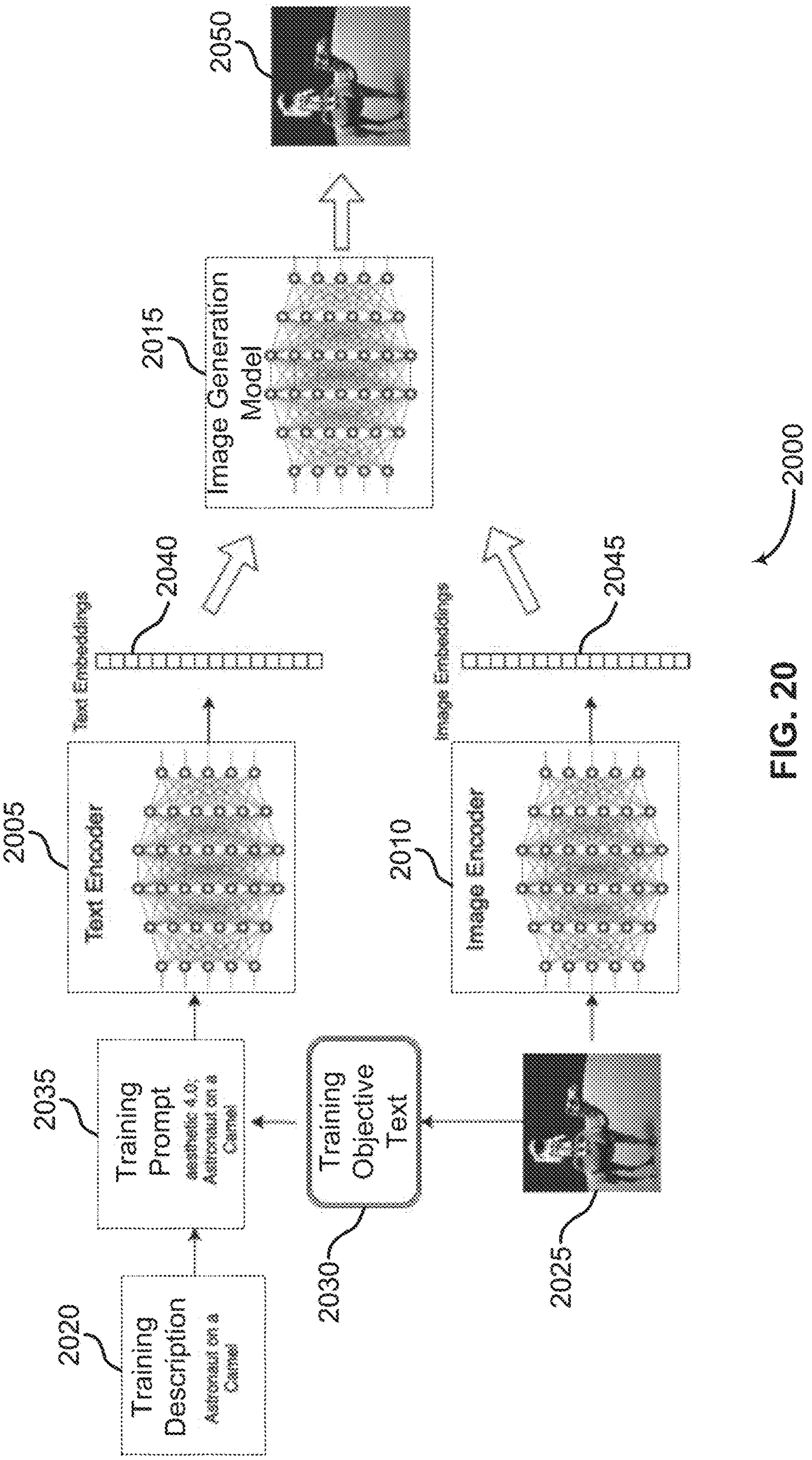
FIG. 20 shows an example of obtaining an image based on a training image according to aspects of the present disclosure.

FIG. 20 shows an example of obtaining an image based on a training image according to aspects of the present disclosure. The example shown includes image generation system 2000, training description 2020, training image 2025, training objective text 2030, training prompt 2035, text embeddings 2040, image embeddings 2045, and image 2050. In one aspect, image generation system 2000 includes text encoder 2005, image encoder 2010, and image generation model 2015. Text embeddings 2040 are an example of, or include aspects of, the guidance embedding described with reference to FIG. 7. Image embeddings 2045 are an example of, or include aspects of, the image features described with reference to FIG. 7.

Image generation system 2000 is an example of, or includes aspects of, the corresponding element described with reference to FIG. 1. In one aspect, image generation system 2000 includes text encoder 2005, image encoder 2010, and image generation model 2015. Text encoder 2005 is an example of, or includes aspects of, an encoder described with reference to FIGS. 5-7. Image encoder 2010 is an example of, or includes aspects of, the corresponding element described with reference to FIG. 7. Image generation model 2015 is an example of, or includes aspects of, the corresponding element described with reference to FIGS. 5 and 11.

Referring to FIG. 20, training objective text 2030 is obtained based on training image 2025. In some cases, a user manually provides training objective text 2030. In some cases, a classifier model (such as the classifier model described with reference to FIGS. 5-6) outputs training objective text 2030 based on training image 2025. For example, in some cases, the classifier model analyzes training image 2025 to determine a level of a target characteristic included in training image 2025. In some cases, the classifier model outputs training objective text 2030 based on a result of the analysis, where training objective text 2030 includes an indication of the determined level of the target characteristic. In some cases, a language generation model (such as the language generation model described with reference to FIG. 5) outputs training objective text 2030 based on an output provided by the classifier model based on training image 2025.

In some cases, a training component (such as the training component described with reference to FIG. 5) generates training prompt 2035 by adding training objective text 2030 to training description 2020 of training image 2025. For example, training prompt 2035 states "aesthetic 4.0; Astronaut on a Camel," where "aesthetic 4.0" is training objective text 2030 and "Astronaut on a Camel" is training description 2020 of training image 2025. In some cases, text encoder 2005 generates text embeddings 2040 based on training prompt 2035. In some cases, image encoder 2010 generates image embeddings 2045 based on training image 2025. In some cases, image generation model 2015 generates image 2050 based on text embeddings 2040, image embeddings 2045, or a combination thereof as described with reference to FIG. 21. In some cases, training component compares image 2050 to training image 2025 to calculate a loss using a loss function.

A loss function refers to a function that impacts how a machine learning model is trained in a supervised learning model. For example, during each training iteration, the output of the machine learning model is compared to the known annotation information in the training data. The loss function provides a value (the "loss") for how close the predicted annotation data is to the actual annotation data. After computing the loss, the parameters of the model are updated accordingly and a new set of predictions are made during the next iteration.

Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (e.g., a vector) and a desired output value (e.g., a single value or an output vector). In some cases, a supervised learning algorithm analyzes the training data and produces the inferred function, which can be used for mapping new examples. In some cases, the learning results in a function that correctly determines the class labels for unseen instances. For example, the learning algorithm generalizes from the training data to unseen examples. In some cases, the training component updates image generation parameters of image generation model 2015 based on the loss.

Figure 21:
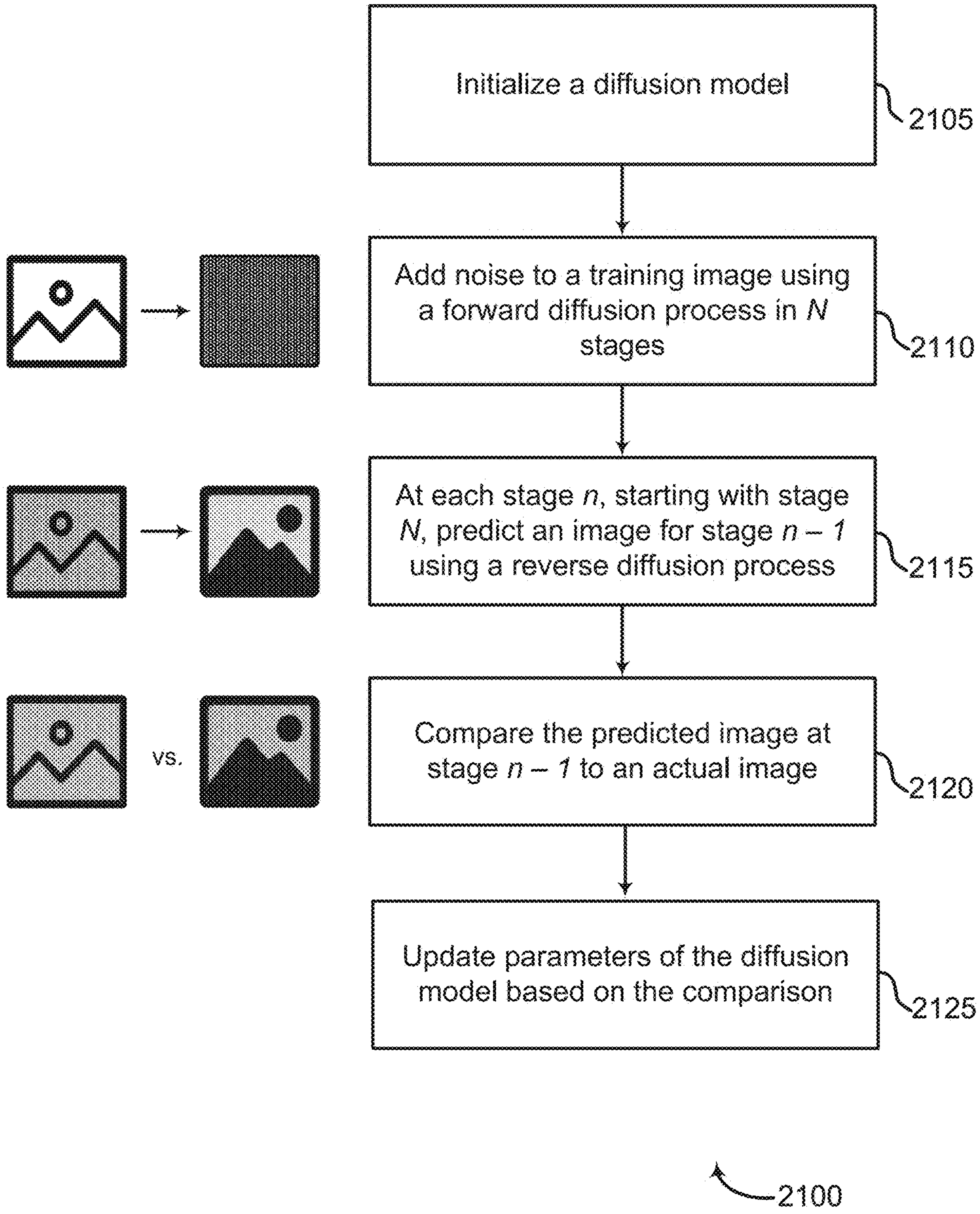
FIG. 21 shows an example of a method for training a diffusion model according to aspects of the present disclosure.

FIG. 21 shows an example of a method 2100 for training a diffusion model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 21, according to some aspects, a training component (such as the training component described with reference to FIG. 5) trains a diffusion model (such as the image generation model described with reference to FIGS. 5-6 and 20) to generate an image.

At operation 2105, the system initializes the diffusion model. In some cases, the operations of this step refer to, or may be performed by, a training component as described with reference to FIG. 5. In some cases, the initialization includes defining the architecture of the diffusion model and establishing initial values for parameters of the diffusion model. In some cases, the training component initializes the diffusion model to implement a U-Net architecture (such as the U-Net architecture described with reference to FIG. 8). In some cases, the initialization includes defining hyperparameters of the architecture of the diffusion model, such as a number of layers, a resolution and channels of each layer block, a location of skip connections, and the like.

At operation 2110, the system adds noise to a training image using a forward diffusion process (such as the forward diffusion process described with reference to FIGS. 7 and 10) in N stages. In some cases, the operations of this step refer to, or may be performed by, a training component as described with reference to FIG. 5. In some cases, the training component retrieves the training image from a database (such as the database described with reference to FIG. 1).

At operation 2115, at each stage n, starting with stage N, the system predicts an image for stage n−1 using a reverse diffusion process (such as a reverse diffusion process described with reference to FIGS. 7 and 10). In some cases, the operations of this step refer to, or may be performed by, the diffusion model. In some cases, each stage n corresponds to a diffusion step t. In some cases, at each stage n, the diffusion model predicts noise that can be removed from an intermediate image to obtain a predicted image. In some cases, an original image is predicted at each stage of the training process.

In some cases, the reverse diffusion process is conditioned on a training prompt (such as the training prompt described with reference to FIG. 20). In some cases, an encoder (such as the encoder described with reference to FIGS. 5-6 and the text encoder described with reference to FIG. 20) obtains the training prompt and generates the guidance features (such as the guidance embedding described with reference to FIG. 7 and the text embeddings described with reference to FIG. 20) in a guidance space (such as the guidance space described with reference to FIG. 7). In some cases, at each stage, the diffusion model predicts noise that can be removed from an intermediate image to obtain a predicted image that aligns with the guidance features.

At operation 2120, the system compares the predicted image at stage n−1 to an actual image, such as the image at stage n−1 or the original input image (e.g., the training image). In some cases, the operations of this step refer to, or may be performed by, a training component as described with reference to FIG. 5. In some cases, the training component computes a loss function based on the comparison.

At operation 2125, the system updates parameters of the diffusion model based on the comparison. In some cases, the operations of this step refer to, or may be performed by, a training component as described with reference to FIG. 5. In some cases, the training component updates the machine learning parameters of the diffusion model based on the loss function. For example, in some cases, the training component updates parameters of the U-Net using gradient descent. In some cases, the training component trains the U-Net to learn time-dependent parameters of the Gaussian transitions. In some cases, the training component optimizes for a negative log likelihood.

Figure 22:
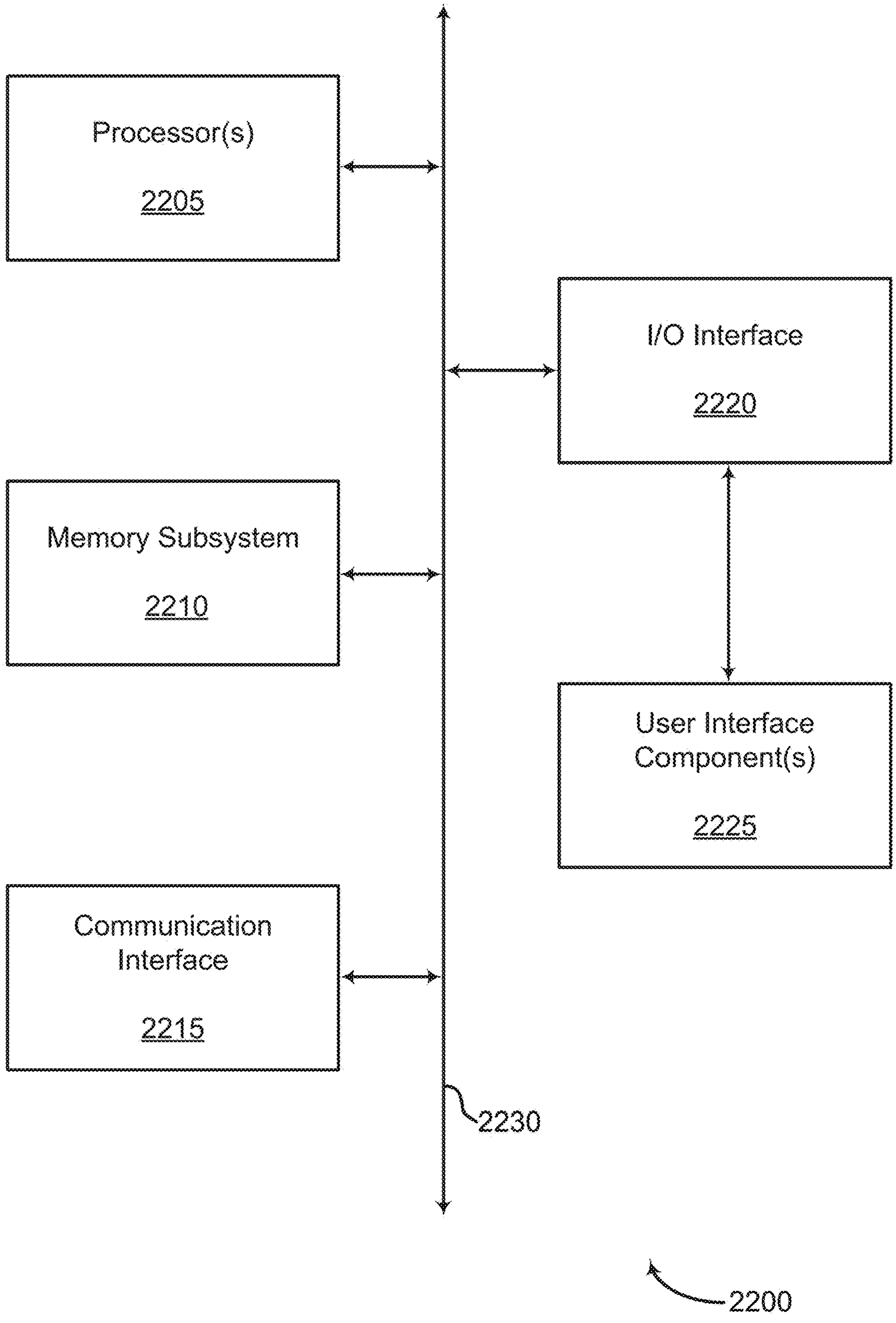
FIG. 22 shows an example of a computing device according to aspects of the present disclosure.

FIG. 22 shows an example of a computing device 2200 according to aspects of the present disclosure. According to some aspects, computing device 2200 includes processor(s) 2205, memory subsystem 2210, communication interface 2215, I/O interface 2220, user interface component(s) 2225, and channel 2230.

In some embodiments, computing device 2200 is an example of, or includes aspects of, the image generation apparatus described with reference to FIGS. 1 and 5. In some embodiments, computing device 2200 includes one or more processors 2205 that can execute instructions stored in memory subsystem 2210 to obtain a text prompt and an indication of a level of a target characteristic, wherein the target characteristic comprises a characteristic used to train an image generation model; generate an augmented text prompt comprising the input text prompt and an objective text corresponding to the indication of the level of the target characteristic; and generate, using an image generation model, an image based on the augmented text prompt, where the image depicts content of the input text prompt and has the level of the target characteristic.

According to some aspects, computing device 2200 includes one or more processors 2205. Processor(s) 2205 are an example of, or includes aspects of, the processor unit as described with reference to FIG. 5. In some cases, a processor is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or a combination thereof.

In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special-purpose components for modem processing, baseband processing, digital signal processing, or transmission processing.

According to some aspects, memory subsystem 2210 includes one or more memory devices. Memory subsystem 2210 is an example of, or includes aspects of, the memory unit as described with reference to FIG. 5. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 2215 operates at a boundary between communicating entities (such as computing device 2200, one or more user devices, a cloud, and one or more databases) and channel 2230 and can record and process communications. In some cases, communication interface 2215 is provided to enable a processing system coupled to a transceiver (e.g., a transmitter and/or a receiver). In some examples, the transceiver is configured to transmit (or send) and receive signals for a communications device via an antenna.

According to some aspects, I/O interface 2220 is controlled by an I/O controller to manage input and output signals for computing device 2200. In some cases, I/O interface 2220 manages peripherals not integrated into computing device 2200. In some cases, I/O interface 2220 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 2220 or via hardware components controlled by the I/O controller.

According to some aspects, user interface component(s) 2225 enable a user to interact with computing device 2200. In some cases, user interface component(s) 2225 include an audio device, such as an external speaker system, an external display device such as a display screen, an input device (e.g., a remote-control device interfaced with a user interface directly or through the I/O controller), or a combination thereof. In some cases, user interface component(s) 2225 include a GUI.

The description and drawings described herein represent example configurations and do not represent all the implementations within the scope of the embodiments. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following embodiments, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image generation, comprising:

obtaining an input text prompt and an indication of a level of a target characteristic, wherein the target characteristic comprises a characteristic used to train an image generation model and the level comprises a value included in a range of values, wherein the value is a numerical value, and wherein the range of values is used to train the image generation model;

generating an augmented text prompt comprising the input text prompt and an objective text corresponding to the indication of the level of the target characteristic, wherein the objective text comprises the target characteristic and the value; and generating, using the image generation model, an image based on the augmented text prompt, wherein the image depicts content of the input text prompt and has the level of the target characteristic.

2. The method of claim 1, further comprising:

determining the level of the target characteristic based on the objective text using a classifier model.

3. The method of claim 1, wherein:

the image generation model is trained using annotated training data including a training image that is labeled based on the target characteristic and a training prompt corresponding to the training image.

4. The method of claim 3, wherein:

the training prompt includes training objective text at a same location as the objective text within the augmented text prompt.

5. The method of claim 1, wherein:

the objective text indicates a level of image quality.

6. The method of claim 1, wherein:

the objective text indicates a number of objects described by the input text prompt.

7. The method of claim 1, further comprising:

encoding the augmented text prompt to obtain a text embedding, wherein the image generation model takes the text embedding as an input.

8. The method of claim 1, wherein generating the augmented text prompt comprises:

prepending the objective text to the input text prompt.

9. A method for image generation, comprising:

obtaining training data including a plurality of training images and a plurality of training prompts respectively corresponding to the plurality of training images, wherein each of the plurality of training images is labeled based on a target characteristic and each of the plurality of training prompts includes objective text comprising the target characteristic and a level of the target characteristic, and wherein the level comprises a value included in a range of values, wherein the value is a numerical value; and training an image generation model to generate images having the level of the target characteristic based on the training data by performing an image generation process conditioned on the plurality of training prompts.

10. The method of claim 9, wherein obtaining the training data comprises:

applying a classifier model to the plurality of training images to determine the levels of the target characteristic; and generating the objective text based on an output of the classifier model.

11. The method of claim 10, wherein:

the classifier model comprises an aesthetic classifier.

12. The method of claim 9, wherein:

the training is based on a diffusion process.

13. The method of claim 9, wherein:

the training data comprises a plurality of different images corresponding to a plurality of levels of the target characteristic, respectively.

14. The method of claim 9, further comprising:

pretraining the image generation model based on unlabeled images.

15. A system for image generation, comprising: one or more processors; one or more memory components coupled with the one or more processors;

an augmentation component configured to add an objective text to an input text prompt to obtain an augmented text prompt, wherein the objective text comprises a target characteristic identified from a set of target characteristics and a level of the target characteristic, wherein the target characteristic comprises a characteristic used to train an image generation model and the level comprises a value included in a range of values, wherein the value is a numerical value, and wherein the range of values is used to train the image generation model; and an image generation model comprising image generation parameters stored in the one or more memory components, the image generation model trained to generate an image based on the augmented text prompt and the set of target characteristics, wherein the image depicts content of the input text prompt and has the level of the target characteristic.

16. The system of claim 15, the system further comprising:

a classifier model comprising classification parameters stored in the one or more memory components, the classifier model trained to determine the level of the target characteristic.

17. The system of claim 16, the system further comprising:

a language generation model comprising language generation parameters stored in the one or more memory components, the language generation model configured to generate the objective text based on an output of the classifier model.

18. The system of claim 15, the system further comprising:

an encoder comprising encoding parameters stored in the one or more memory components, the encoder configured to encode the augmented text prompt to obtain a text embedding.

19. The system of claim 15, the system further comprising:

a user interface configured to obtain the input text prompt from a user.

20. The system of claim 15, the system further comprising:

a training component configured to train the image generation model using annotated training data including a training image that is labeled based on the target characteristic and a training prompt corresponding to the training image.

* * * * *